United States Patent
Oertley

(10) Patent No.: US 9,751,577 B2
(45) Date of Patent: Sep. 5, 2017

(54) REVERSIBLE TRACK LINK SYSTEM

(71) Applicant: Caterpillar Inc., Peoria, IL (US)

(72) Inventor: Tom Oertley, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/937,462

(22) Filed: Nov. 10, 2015

(65) Prior Publication Data

US 2016/0176456 A1   Jun. 23, 2016

Related U.S. Application Data

(60) Provisional application No. 62/095,484, filed on Dec. 22, 2014.

(51) Int. Cl.
*B62D 55/21* (2006.01)
*B62D 55/275* (2006.01)
*B62D 55/26* (2006.01)
*B62D 55/20* (2006.01)
*B62D 55/28* (2006.01)

(52) U.S. Cl.
CPC ........... *B62D 55/213* (2013.01); *B62D 55/20* (2013.01); *B62D 55/21* (2013.01); *B62D 55/211* (2013.01); *B62D 55/26* (2013.01); *B62D 55/275* (2013.01); *B62D 55/28* (2013.01)

(58) Field of Classification Search
CPC ...... B62D 55/20; B62D 55/21; B62D 55/211; B62D 55/213; B62D 55/26; B62D 55/28; B62D 55/275
See application file for complete search history.

(56) References Cited

U.S. PATENT DOCUMENTS

| 1,258,605 | A | * | 3/1918 | Norelius et al. | B62D 55/205 |
| | | | | | 305/139 |
| 1,318,188 | A | * | 10/1919 | Tritton | B62D 55/0845 |
| | | | | | 305/109 |
| 1,964,533 | A | * | 6/1934 | Rogers | B62D 55/20 |
| | | | | | 305/113 |
| 2,536,064 | A | * | 1/1951 | Knox | B62D 55/205 |
| | | | | | 305/189 |
| 3,032,376 | A | | 5/1962 | Blazek et al. | |
| 3,601,212 | A | * | 8/1971 | Peterson | B62D 55/14 |
| | | | | | 152/182 |

(Continued)

FOREIGN PATENT DOCUMENTS

| DE | 10113412 | 10/2002 |
| EP | 1391371 B1 | 4/2007 |

*Primary Examiner* — Kip T Kotter

(57) ABSTRACT

A track assembly for a machine comprising track pads with a ground engaging surface opposite link engaging surfaces and a lug protruding between the link engaging surfaces. The track assembly includes pairs of links disposed on the link engaging surfaces of the track pads. The pairs of links include an outer link having an outer bushing end and an outer pin end, and an inner link spaced-apart from the outer link. The inner link has an inner bushing end and an inner pin end. A distance between the inner bushing ends and the outer bushing ends is less than a distance between the inner pin ends and the respective outer pin ends. The track assembly includes pins connecting the bushing ends of pairs of links to the pin ends of adjacent pairs of links forming endless chains. The endless chains connect adjacent track pads in an endless loop.

20 Claims, 25 Drawing Sheets

(56) References Cited

U.S. PATENT DOCUMENTS

| | | | |
|---|---|---|---|
| 3,680,928 A | | 8/1972 | Kraschnewski et al. |
| 3,680,929 A | | 8/1972 | Hnilicka et al. |
| 3,913,986 A | * | 10/1975 | Schaffner ............... B62D 55/20 |
| | | | 305/187 |
| 3,937,530 A | | 2/1976 | Sturges |
| 4,114,958 A | | 9/1978 | Boggs |
| 4,278,301 A | | 7/1981 | Gregor et al. |
| 4,324,437 A | | 4/1982 | Narang |
| 4,365,848 A | | 12/1982 | Grilli et al. |
| 4,452,495 A | | 6/1984 | Orlandea |
| 5,500,058 A | * | 3/1996 | Hirakawa ............... B21K 23/02 |
| | | | 148/649 |
| 5,685,620 A | * | 11/1997 | Bertoni .................. B62D 55/20 |
| | | | 305/201 |
| 6,120,405 A | | 9/2000 | Oertley et al. |
| 6,220,378 B1 | | 4/2001 | Oertley et al. |
| 8,272,701 B2 | | 9/2012 | Mulligan |
| 2003/0141760 A1 | * | 7/2003 | Yamamoto ........... B62D 55/211 |
| | | | 305/185 |
| 2004/0032166 A1 | * | 2/2004 | Maguire .............. B62D 55/213 |
| | | | 305/186 |
| 2005/0088042 A1 | * | 4/2005 | Hisamatsu ............. B62D 55/21 |
| | | | 305/185 |
| 2008/0284245 A1 | | 11/2008 | Livesay et al. |
| 2013/0342006 A1 | | 12/2013 | Kunigk |
| 2014/0152086 A1 | * | 6/2014 | Meyer ................... B62D 55/21 |
| | | | 305/142 |
| 2015/0375813 A1 | * | 12/2015 | Talbot ................. B62D 55/202 |
| | | | 305/198 |

* cited by examiner

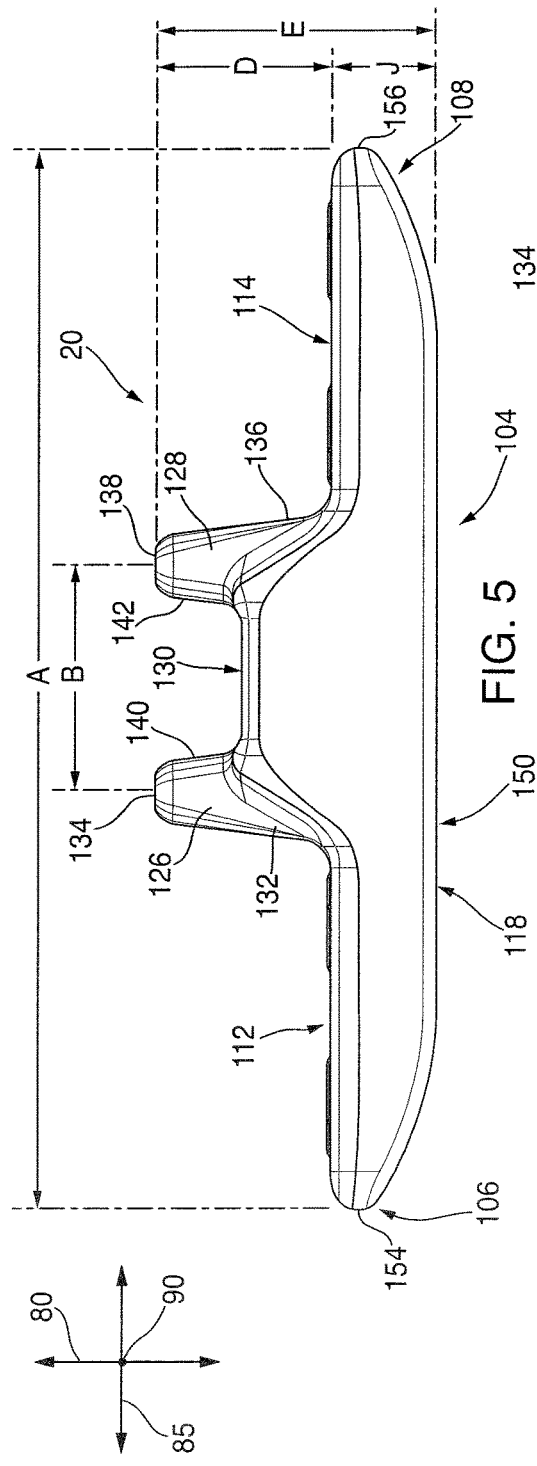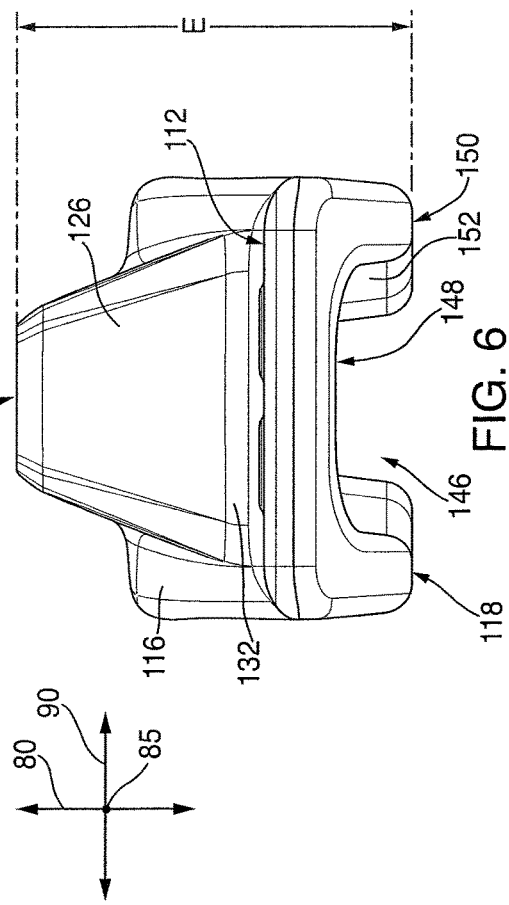

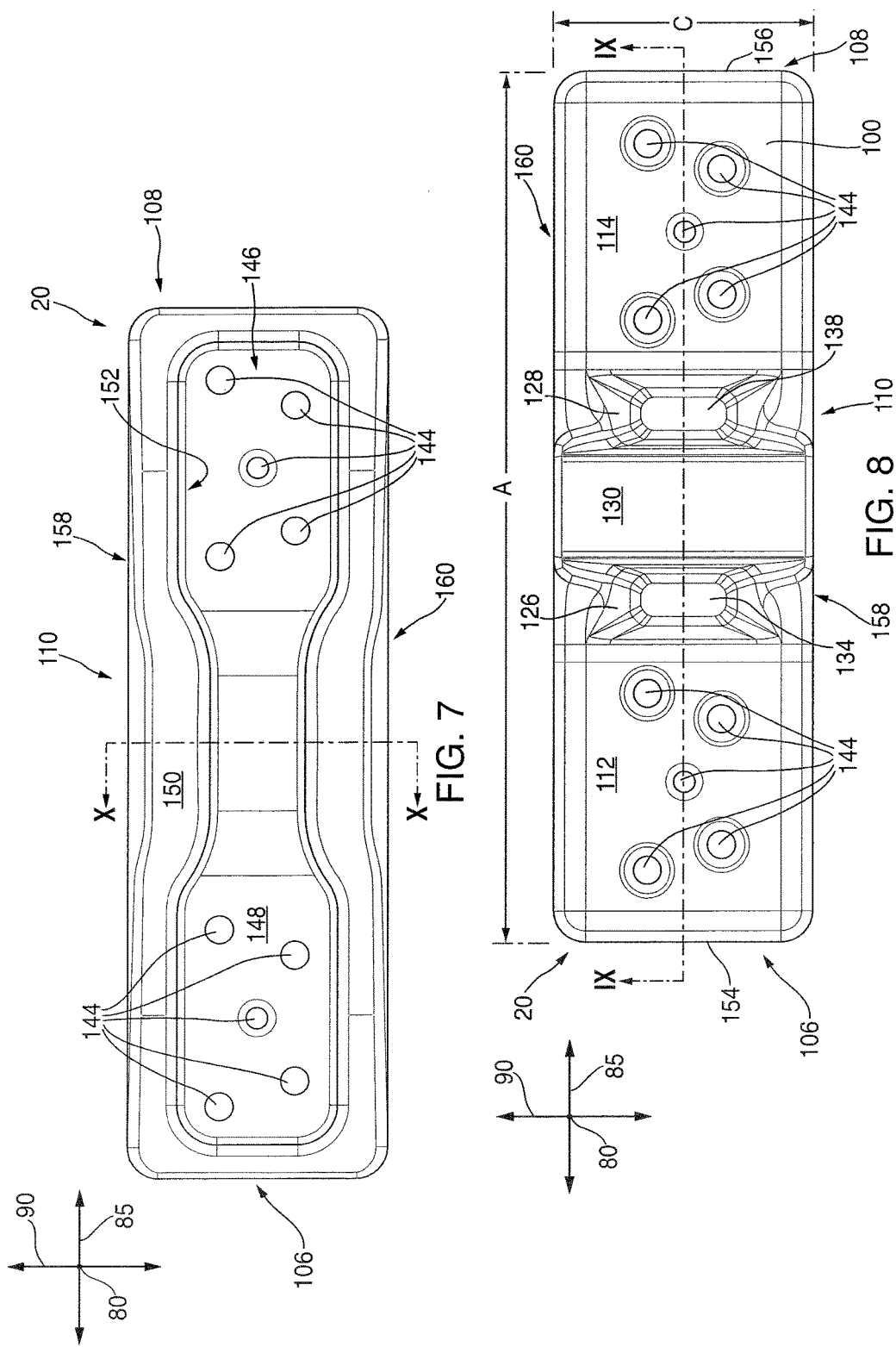

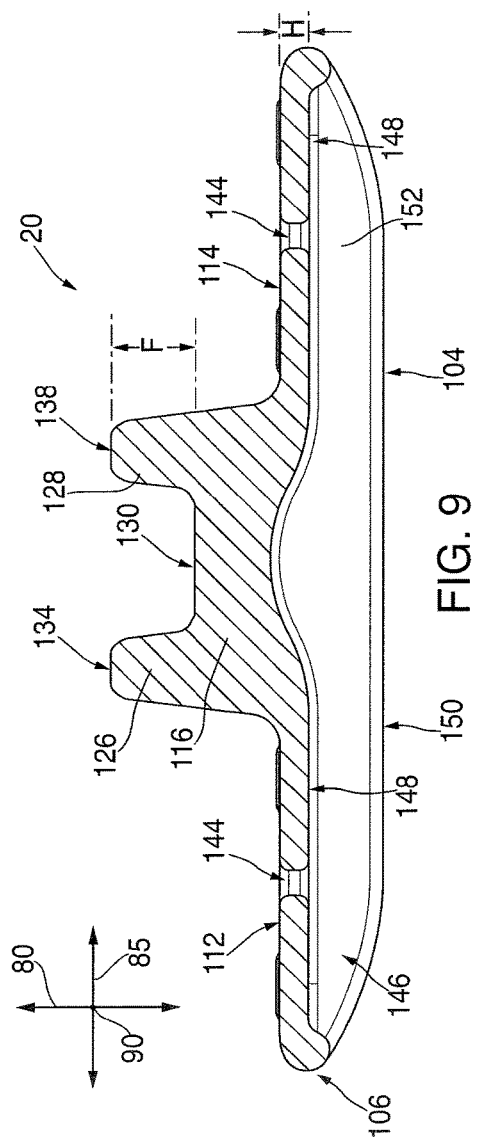
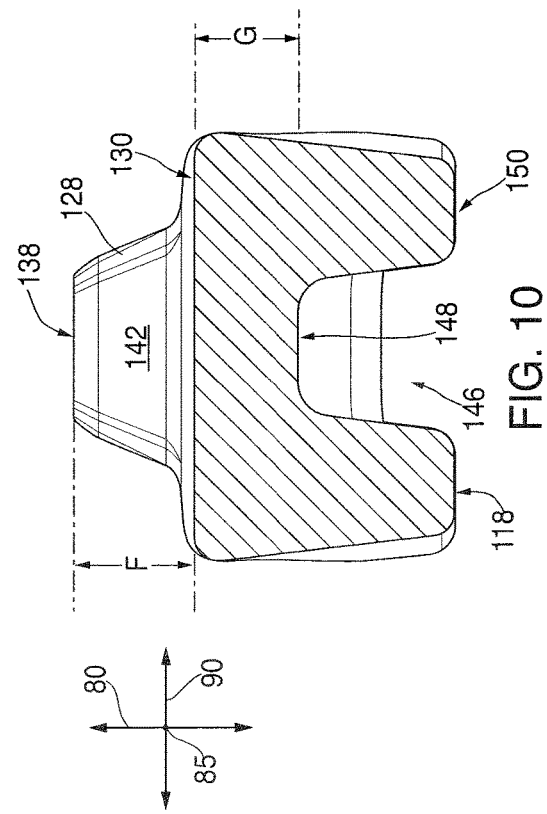

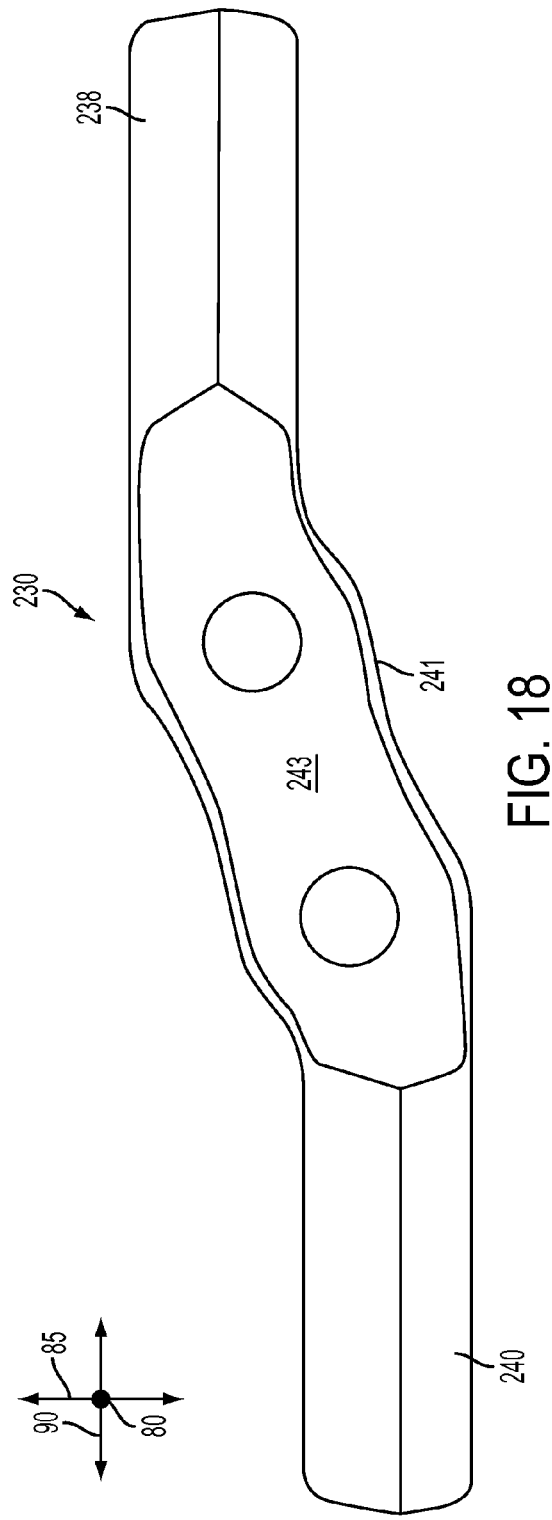
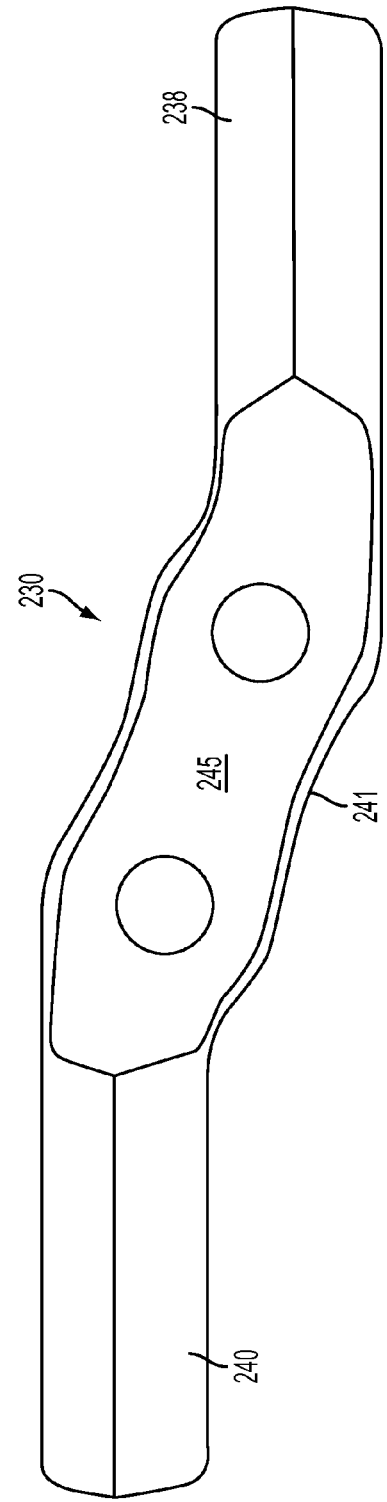

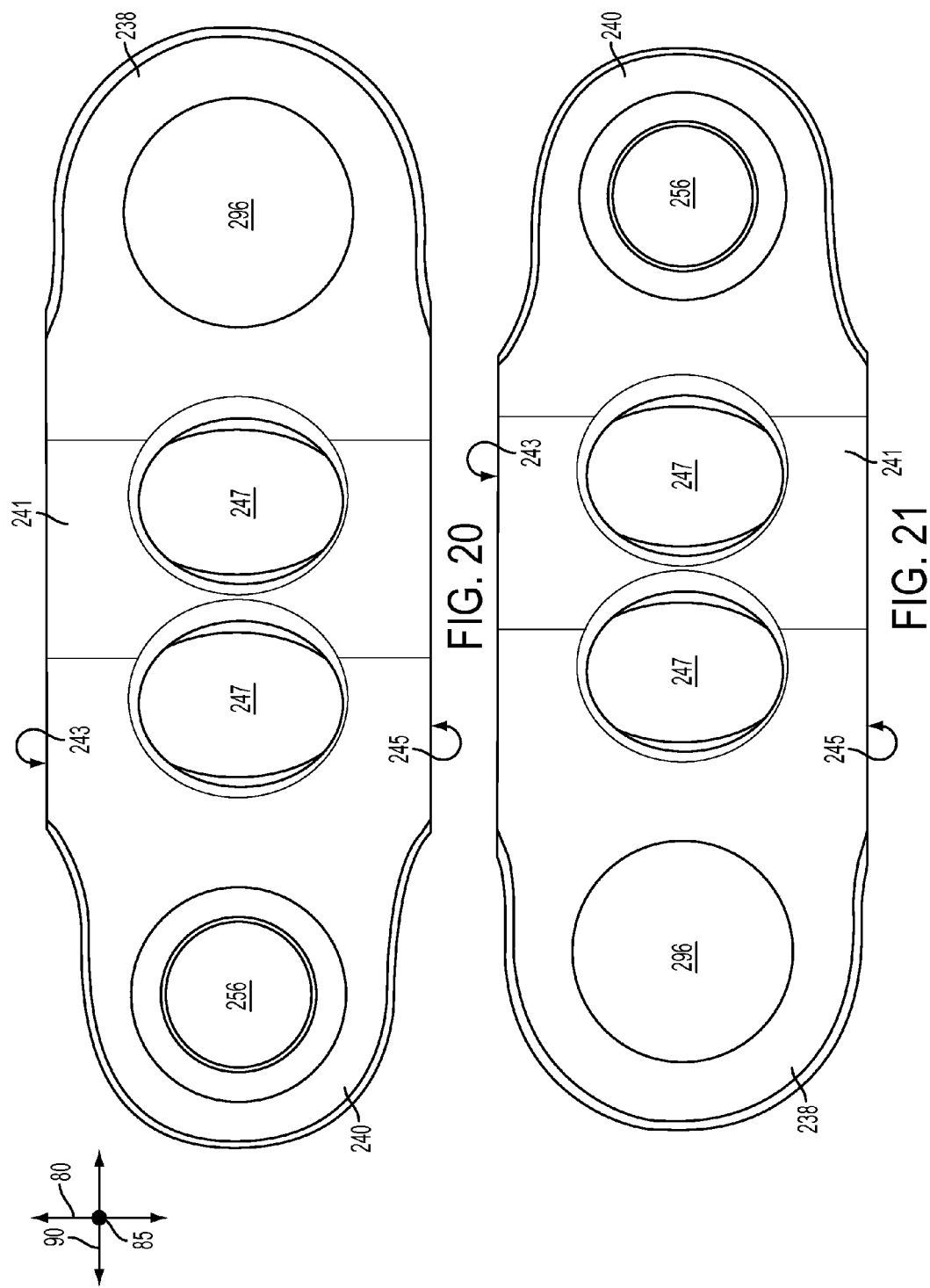

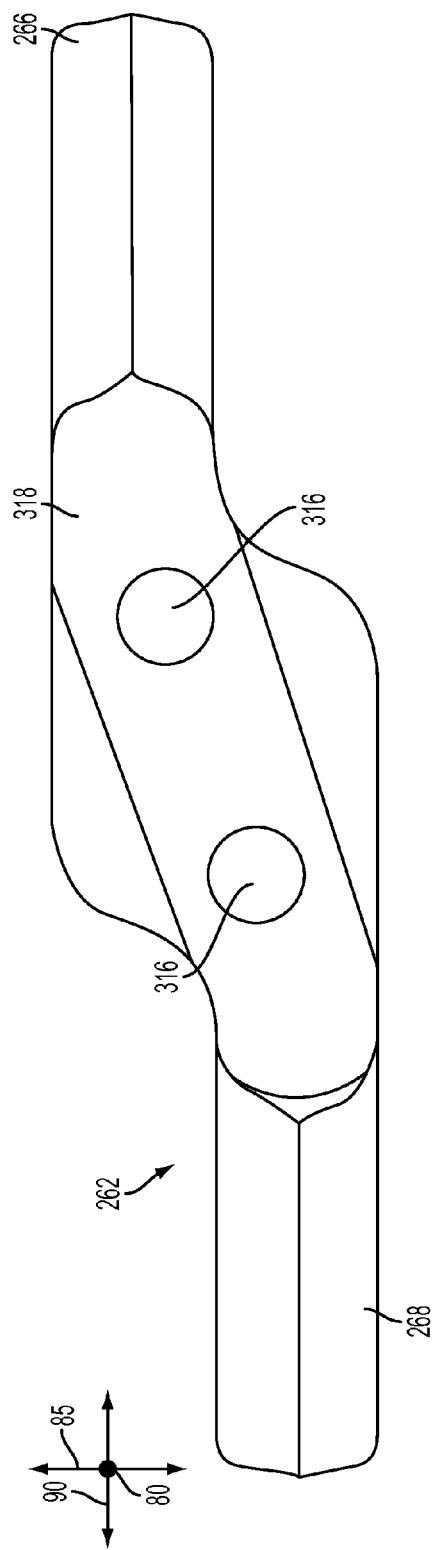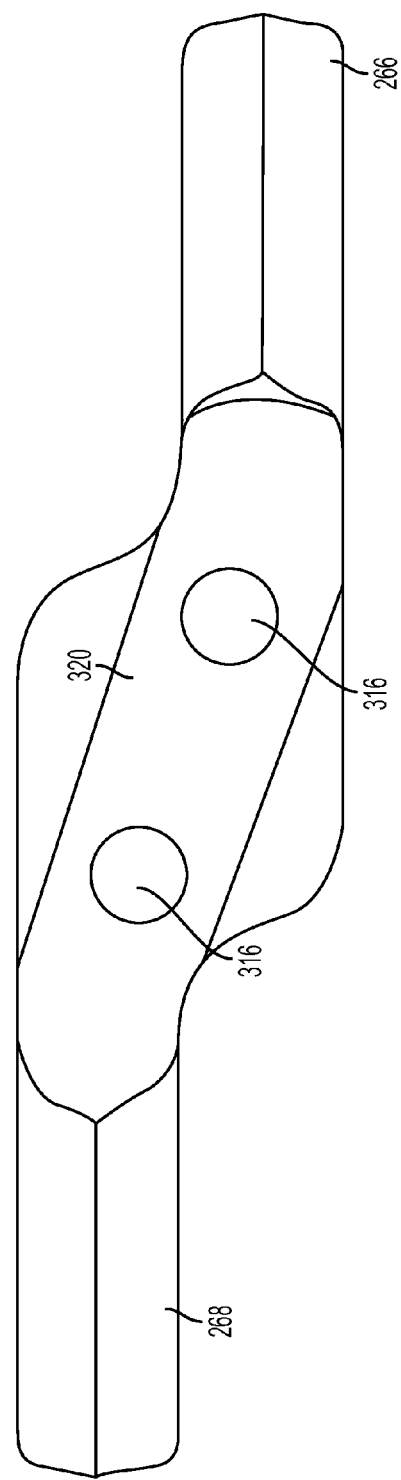
FIG. 29
FIG. 30

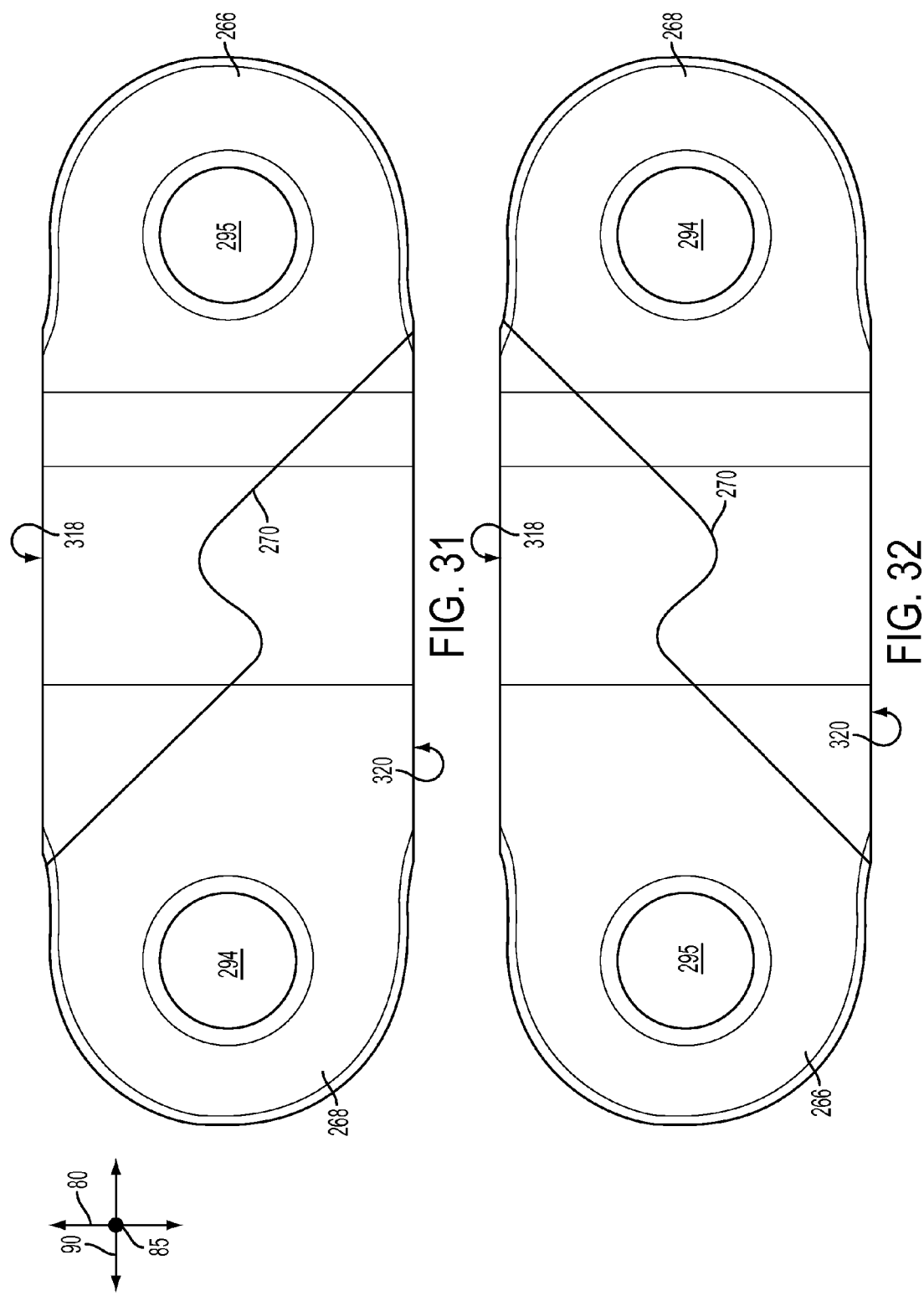

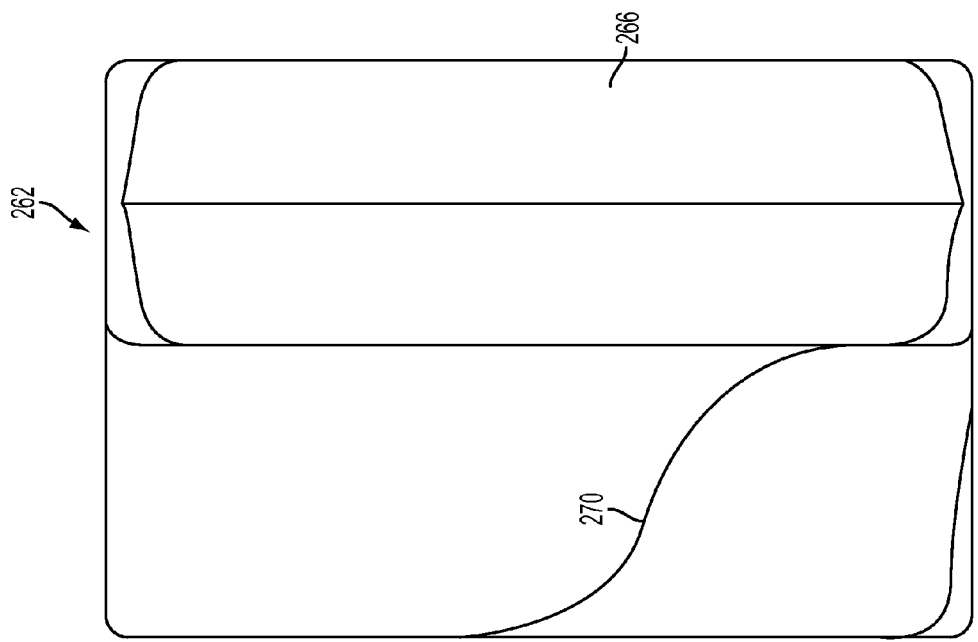
FIG. 34
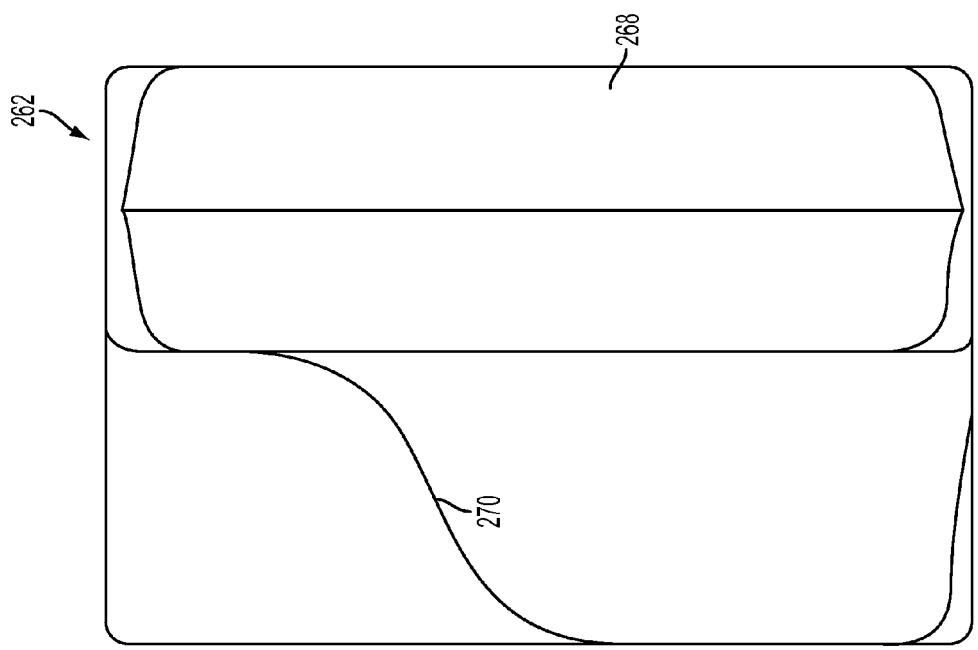
FIG. 33
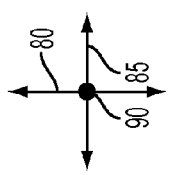

REVERSIBLE TRACK LINK SYSTEM

CROSS-REFERENCE TO RELATED APPLICATIONS

This patent application claims the benefit of priority to U.S. Provisional Patent Application No. 62/095,484, filed on Dec. 22, 2014, and entitled "Reversible Track Link System," which is incorporated in its entirety herein by reference.

TECHNICAL FIELD

This patent disclosure relates generally to track pads and, more particularly to track pads for a track assembly.

BACKGROUND

Various types of mining and construction machines, such as tractors, bulldozers, backhoes, excavators, motor graders, and mining trucks commonly use tracks as a method of machine propulsion. Such track-type mobile machines use track-type treads located at either side of the machine. The tracks each include a chain having links pinned end-to-end to form a loop that extend around main drive wheels of the machine. The wheels drive the tracks around the wheel frames to move the machine in the desired direction.

Traditionally, track-type treads comprise a plurality of crawler shoes made up of a ground engaging pad and a pair of links connected to the pads and joined to adjacent links with pins. Commonly, the links and ground engaging pad that make up the crawler shoe are forged or cast together as a single component. Due to high impact loads encountered by crawler shoes during machine operation, traditional crawler shoes require excess material to overcome demanding conditions. Even using additional material, crawler shoes are subject to wear and need to be periodically replaced. Excessive crawler shoe replacement and maintenance can result excessive machine downtime and decreased operating efficiency.

Additionally, it is common for the links connecting adjacent crawler pads to contact drive wheels, idlers, or other machine components to transfer power from the drive wheels to the treads. In such conditions, portions of the links are exposed to significant wear. In order to withstand such wear exposure, it is common to provide wear surfaces of the links with tougher, harder material than would otherwise be used to make the links.

A track assembly is needed that overcomes one or more of the problems set forth above.

SUMMARY

The disclosure describes, in one aspect, a track link segment for a track assembly of a mobile machine. The track link segment comprises a track pad having a ground engaging surface opposite first and second link engaging surfaces, and a lug protruding between the link engaging surfaces and above the link engaging surfaces with respect to the ground engaging surface. The lug is configured to periodically engage a drive wheel of the machine. The track link segment includes a first pair of links disposed on the first link engaging surface of the track pad. The first pair of links includes a first outer link having an outer bushing end and an outer pin end, and a first inner link laterally and substantially symmetrically spaced apart from the first outer link. The first inner link has an inner bushing end and an inner pin end. A distance between the inner bushing end of the first inner link and the outer bushing end of the first outer link is less than a distance between the inner pin end of the first inner link and the outer pin end of the first outer link. A second pair of links is disposed on the second link engaging surface of the track pad. The second pair of links includes a second outer link having an outer bushing end and an outer pin end. A second inner link is laterally and substantially symmetrically spaced apart from the second outer link, the second inner link having an inner bushing end and an inner pin end. A distance between the inner bushing end of the second inner link and the outer bushing end of the second outer link is less than a distance between the inner pin end of the second inner link and the outer pin end of the second outer link. The track link segment includes a first bushing connecting the first inner and outer links between the inner bushing end of the first inner link and the outer bushing end of the first outer link, and a second bushing connecting the second inner and outer links between the inner bushing end of the second inner link and the outer bushing end of the second outer link.

In another aspect, the disclosure describes a track assembly for a mobile machine. The track assembly comprises a plurality of track pads. Each track pad comprises a ground engaging surface opposite first and second link engaging surfaces, and a lug protruding between the link engaging surfaces above the link engaging surfaces with respect to the ground engaging surface. The lug is configured to periodically engage a drive wheel of the machine. The track assembly includes a plurality of first and second pairs of links. The first pairs of links are disposed on the first link engaging surfaces of the track pads and the second pairs of links are disposed on the second link engaging surfaces of the track pads. Each of the first and second pairs of links comprise an outer link having an outer bushing end and an outer pin end, and an inner link laterally and substantially symmetrically spaced-apart from the outer link. The inner link has an inner bushing end and an inner pin end. A distance between the inner bushing ends of the inner links and the respective outer bushing ends of the outer links is less than a distance between the inner pin ends of the inner links and the respective outer pin ends of the outer links. The track assembly also includes a plurality of pins connecting the inner and outer bushing ends of first pairs of links to the inner and outer pin ends of adjacent first pairs of links so as to form a first endless chain, and connecting the inner and outer bushing ends of the second pairs of links to the inner and outer pin ends of the adjacent second pairs of links so as to form a second endless chain. The first and second endless chains connect adjacent track pads in an endless loop.

In another aspect, the disclosure describes a master track segment for a track assembly of a mobile machine. The master track segment comprises a track pad having a ground engaging surface opposite first and second link engaging surfaces, and a lug protruding between the link engaging surfaces and above the link engaging surfaces with respect to the ground engaging surface. The lug is configured to periodically engage a drive wheel of the machine. The master track segment includes a first pair of master links disposed on the first link engaging surface of the track pad. The first pair of master links includes a first left master link comprising a left bushing portion and a left pin portion mated to one another along a first left mating interface, and a first right master link comprising a right bushing portion and a right pin portion mated to one another along a first right mating interface. The first right master link is laterally spaced apart from the first left master link such that the left and right bushing portions are substantially aligned with one another and the left and right pin portions are substantially aligned with one another. The master track segment includes a second pair of master links disposed on the second link engaging surface of the track pad. The second pair of master links includes a second left master link comprising a left bushing portion mated with a left pin portion along a second left mating interface, and a second right master link comprising a right bushing portion and a right pin portion mated to one another along a second right mating interface. The second right master link is laterally spaced apart from the second left master link such that the left and right bushing portions are substantially aligned with one another and the left and right pin portions are substantially aligned with one another.

BRIEF DESCRIPTION OF THE DRAWINGS

The disclosure will become more fully understood from the following detailed description, taken in conjunction with the accompanying figures, wherein like reference numerals refer to like elements, in which:

FIG. 5 is a front view of the track pad of FIG. 3;

FIG. 6 is a left side elevation view of the track pad of FIG. 3;

FIG. 7 is a bottom view of the track pad of FIG. 3;

FIG. 8 is a top view of the track pad of FIG. 3.

FIG. 9 is a front sectional view of the track pad of FIG. 3 as indicated in FIG. 8;

FIG. 10 is a left side sectional view of the track pad of FIG. 3 as indicated in FIG. 7;

FIG. 18 is a top view of the link of FIG. 16;

FIG. 19 is a bottom view of the link of FIG. 16;

FIG. 20 is a left side view of the link of FIG. 16;

FIG. 21 is a right side view of the link of FIG. 16;

FIG. 29 is a top view of the left master link of FIG. 27;

FIG. 30 is a bottom view of the left master link of FIG. 27;

FIG. 31 is a left side view of the left master link of FIG. 27;

FIG. 32 is a right side view of the left master link of FIG. 27;

FIG. 33 is a rear view of the left master link of FIG. 27;

FIG. 34 is a front view of the left master link of FIG. 27.

DETAILED DESCRIPTION

Figure 1:
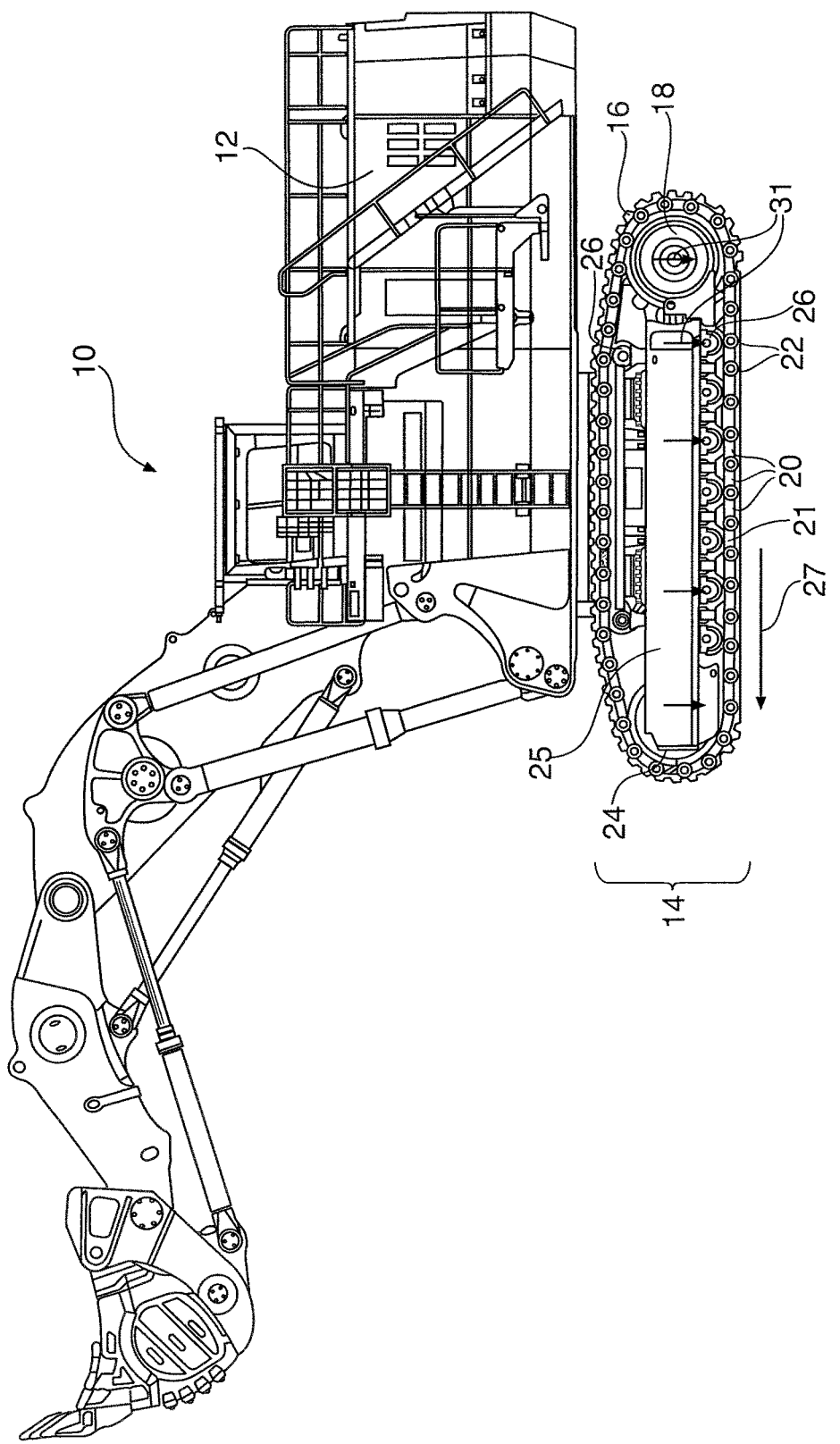
FIG. 1 is a side view illustration of an exemplary track-type machine.

This disclosure relates to track-type treads and track pads incorporated in track-type treads used in various types of tractors, bulldozers, backhoes, excavators, motor graders, mining trucks, and other construction machinery. FIG. 1 illustrates a track-type machine 10 having an engine 12 supported by a frame and configured to drive a tracked undercarriage 14. While FIG. 1 shows a machine 10 in the form of a hydraulic excavator, it is contemplated that the machine could be any type of material moving or construction machine, such as a front shovel, a dozer, a loader, or another material moving machine.

The undercarriage 14 can include parallel track assemblies 16 that are disposed at opposing sides of the machine 10 and driven by the engine 12 via corresponding drive wheels 18 (only one track assembly 16 and one drive wheel 18 are shown in FIG. 1). Each track assembly 16 can include a plurality of track pads 20 arranged end-to-end and connected by a pair of endless chains 21, 23 (only one endless chain 21 shown in FIG. 1) to form an endless loop. The track assemblies 16 may be wrapped around corresponding drive wheels 18, one or more idler wheels, and at least one roller 26. Pins 22 can connect pairs of links to form the endless chains 21, 23. The drive wheels 18 can engage the track pads 20 and thereby transmit torque from the engine 12 to track assemblies 16. The idler wheel 24 and the rollers 26 may guide the track assemblies 16 in a general elliptical trajectory around the drive wheels 18. A tensioner 25 may be disposed between the idler wheel 24 and the drive wheel 18 to push the idler wheel and the drive wheel apart and thereby maintain a desired tension of the track assembly 16. The track pads 20 may function to transmit the torque from drive wheels 18 as a driving linear (tractive) force 27 into a ground surface. The weight of the machine 10 can be transmitted from drive wheel 18, idler wheel 24, and rollers 26 through track pads 20 as a bearing force 31 into the ground surface.

Figure 2:
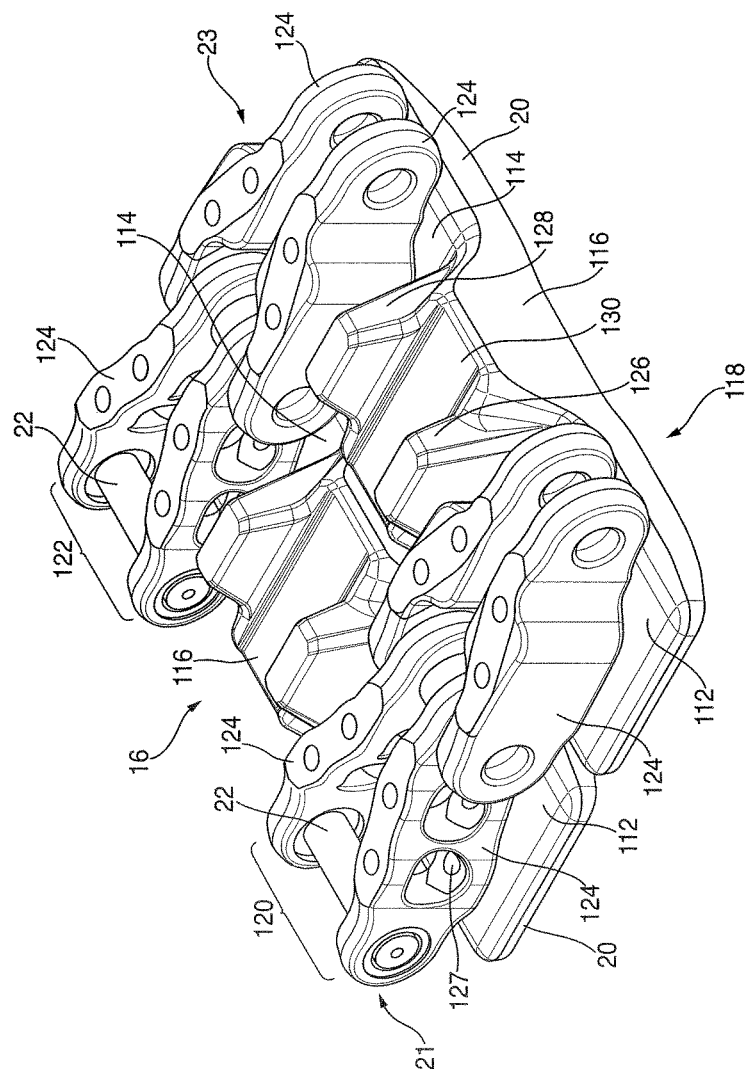
FIG. 2 is a perspective view of a portion of a track assembly in accordance with the disclosure.

FIG. 2 shows a portion of a track assembly 16. The portion of the track assembly 16 shown in FIG. 2 shows only two track pads 20 connected by portions of first endless chain 21 and second endless chain 23, but it is to be understood that the portions shown in FIG. 2 are merely for ease of illustration and that an entire endless loop track assembly is contemplated. As illustrated, FIG. 2 shows two track pads 20 arranged adjacent to one another. Each track pad 20 can include a first link engaging surface 112, a second link engaging surface 114, and a lug 116 protruding from between the first and second link engaging surfaces. The lugs 116 can each include a first arm 126 and a second arm 128 that protrude above a roller path surface 130. The lug 116 can protrude vertically so as to enable the lug to periodically engage with the drive wheel 18 of the machine 10 in order drive the track assembly 16. The track pads 20 can also each include ground engaging surface 118 disposed on opposite the first and second link engaging surfaces 112, 114.

The endless chains 21, 23 can be made up of a plurality of first pairs of links 120 and a plurality of second pairs of links 122 arranged end-to-end. A plurality of links 124 make up the first and second pairs of links 120, 122. Although FIG. 2 shows links 124 that form a tapering pair of links, other shapes of links 124 are contemplated herein. A plurality of pins 22 can connect adjacent pairs of links 120, 122 in a pivotal connection. The set of first pairs of links 120 can be disposed on the first link engaging surface 112, and the set of second pairs of links 122 can be disposed on the second link engaging surface 114. The links 124 making up the first and second pairs of links 120, 122 can be mounted to the respective first and second link engaging surfaces 112, 114 using fasteners 127, such as bolts, screws, rivets, or any other suitable fasteners. Thus, in the embodiment illustrated in FIG. 2, the lugs 116 of the track pads 20 can engage the drive wheels 18 of the machine 10, and the first and second endless chains 21, 23 create a connection between adjacent track pads. It will be understood that any of the links can be prepared, e.g., by a machining process, to produce a suitable surface on one or both of the link upper and lower surfaces (see below) for engaging a link engaging surface. In this manner, when both surfaces are machined, the link can be used in either the left hand or right hand side of the pairs of links and when only one surface is machined, the link is intended to be used in one of the positions thereof with the machined surface disposed in contact with the link engaging surface.

Figure 3:
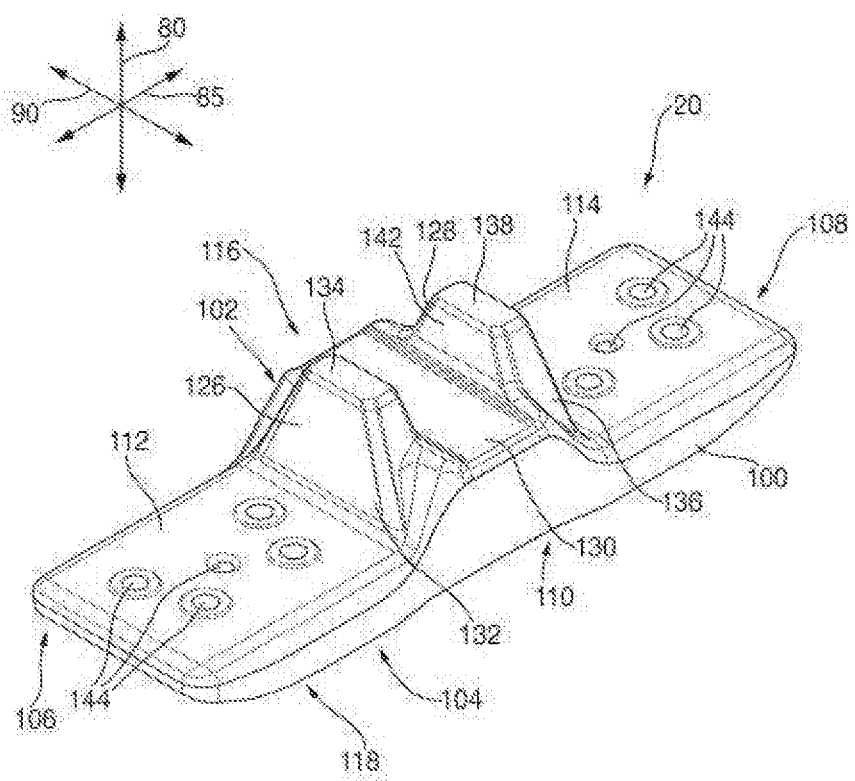
FIG. 3 is a perspective view taken from the top, front, and left side of a track pad in accordance with the disclosure.

FIGS. 3-10 show several different views of one of the plurality of track pads 20 that can be included in the track assemblies 16. For the purpose of illustration and reference, the figures indicate a set of axes including a normal axis 80, a lateral axis 85, and a longitudinal axis 90. Referring to FIG. 3, the track pad 20 includes a body 100 that can include a top portion 102, a bottom portion 104, a first end portion 106, a second end portion 108, and a central portion 110 that can be disposed between the first and second end portions. The ground engaging surface 118 can be defined on the bottom portion 104 of the body 100. The first link engaging surface 112 can be defined on the top portion 102 at the first end portion 106, and the second link engaging surface 114 can be disposed on the top portion 102 at the second end portion 108. In certain embodiments, the first and second link engaging surfaces 112, 114 can be substantially aligned along the longitudinal axis 90 and the lateral axis 85. In some embodiments, the first and second link engaging surfaces 112, 114 can be co-planar, but other configurations are also contemplated.

The lug 116 can protrude from the central portion 110 of the body 100 of the track pad 20, between the first and second link engaging surfaces 112, 114. The lug 116 can extend above the first and second link engaging surfaces 112, 114 with respect to the ground engaging surface 118 along the normal axis 80. The lug 116 can have a first arm 126, a second arm 128, and a roller path surface 130. The roller path surface 130 can be disposed between the first and second arms 126, 128. The first and second arms 126, 128 project above the roller path surface 130 with respect to the first and second link engaging surfaces 112, 114 along the normal axis 80. A channel can be formed between a first inner arm surface 140 and a second inner arm surface 142 of the respective first and second arms 126, 128, and above the roller path surface 130. The first arm 126 can have a first arm base 132 adjacent the first link engaging surface 112. The first arm 126 can tapers upwardly so as to form a first arm top surface 134 at a distal end of the first arm that can be narrower than the first arm base 132. Similarly, the second arm 128 can have a second arm base 136 adjacent the second link engaging surface 114. The second arm 128 can taper upwardly so as to form a second arm top surface 138 at a distal end of the second arm that can be narrower than the second arm base 136. Although the first and second arm top surfaces 134, 138 can have a rounded surface shape, it is also contemplated that the first and second arm top surfaces 134, 138 can be substantially co-planar and aligned substantially along the longitudinal axis 90 and the lateral axis 85.

Although the figures depict an embodiment of the track pad with a lug 116 including a roller path surface 130 disposed between first and second arms 126, 128, other lug configurations are contemplated. For example, the lug could have a single-arm construction in which single arm is configured to engage a drive wheel of the machine. In some embodiments, the lug can include two roller paths on opposite sides of a single arm, and roller paths with curved or flat surfaces. Other suitable lug configurations are also contemplated to engage with the machine's drive wheel, such as a roller path surface that extends above the arms of the lug.

Figure 4:
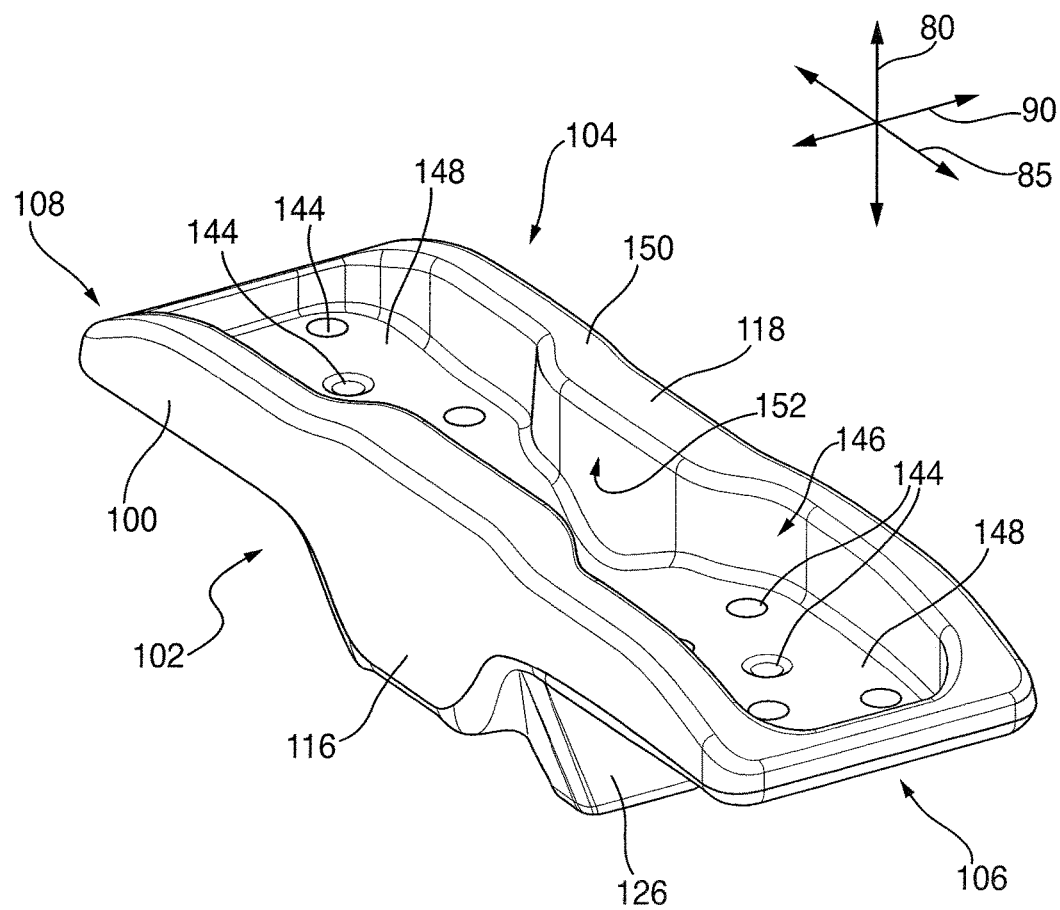
FIG. 4 is a perspective view taken from the bottom, front, and left side of the track pad of FIG. 3.

Referring now to FIG. 4, the track pad 20 is shown from a bottom perspective view. A bottom cavity 146 can be formed into the bottom portion 104 of the body 100. A cavity portion 148 of the ground engaging surface 118 can be defined along the base of the bottom cavity 146, and an edge portion 150 of the ground engaging surface 118 can be defined along the bottom portion 104 substantially surrounding the bottom cavity. A cavity wall surface 152 can be formed on the ground engaging surface 118 between the cavity portion 148 and the edge portion 150.

As shown in both FIG. 3 and FIG. 4, some embodiments can include at least one fastener hole 144 formed through the body 100 between the first link engaging surface 112 and the ground engaging surface 118, and at least one fastener hole can be formed through the body between the second link engaging surface 114 and the ground engaging surface 118. In some embodiments, such as the embodiment illustrated in FIG. 4, fastener holes 144 can be formed through the body 100 between the first and second link engaging surfaces 112, 114 and the cavity portion 148 of the ground engaging surface 118. While the embodiment illustrated in FIG. 3 and FIG. 4 show five fastener holes 144 formed through the body 100 of the track pad 20 at each of the first link engaging surface 112 and the second link engaging surface 114, it is contemplated that other numbers of fastener holes can be used in other embodiments.

Referring now to FIG. 5, the track pad 20 can have an overall body width A measured along the lateral axis 85. The body width A can be measured between a first body end 154 and a second body end 156. The track pad 20 can also have an arm width B measured along the lateral axis 85 between the first arm 126 and the second arm 128. As shown in FIGS. 5 and 6, the track pad 20 can have an overall body height E measured along the normal axis 80 between the edge portion 150 of the ground engaging surface 118 and the first and second arm top surfaces 134, 138 of the respective first and second arms 126, 128. As shown in FIG. 5, the body height E can be broken into an arm height D and a linking height J, both measured along the normal axis 80. The arm height D can be measured between either of the first or second link engaging surfaces 112, 114 and either of the first or second arm top surfaces 134, 138. The linking height J can be measured between the edge portion 150 of the ground engaging surface 118 and either the first or second link engaging surface 112, 114. As shown in FIG. 8, the track pad 20 can have an overall body length C measured along the longitudinal axis 90. The body length C can be measured between a front end 158 of the body 100 and a rear end 160 of the body.

FIG. 9 illustrates a cross section of the track pad 20 as indicated in FIG. 8. The cross section shown in FIG. 9 is taken along a plane defined by the normal axis 80 and the lateral axis 85. FIG. 10 illustrates a cross section of the track pad 20 as indicated in FIG. 7. The cross section shown in FIG. 10 is taken along a plane defined by the normal axis 80 and the longitudinal axis 90. Referring now to FIG. 9 the track pad 20 can have a body thickness H. The body thickness H can be measured along the normal axis 80 between either the first or second link engaging surface 112, 114 and the cavity portion 148 of the ground engaging surface 118. As shown in FIGS. 9 and 10, the track pad 20 can also have a channel height F measured along the normal axis 80 between the roller path surface 130 and either the first or second arm top surfaces 134, 138. FIG. 10 also illustrates a roller path thickness G measured along the normal axis 80 between the roller path surface 130 of the lug 116 and the cavity portion 148 of the ground engaging surface 118.

The ratios described in the following paragraphs between certain dimensional features of the track pad 20 are not meant to be exhaustive, but are merely examples of geometric ratios and relationships between dimensions of the track pad described above with reference to FIGS. 5-10 and otherwise disclosed herein. For instance, in some embodiments, a ratio between the body height E and a linking height J can be at least about 2:1, or at least 3:1 in other embodiments. In some embodiments, a ratio between the body height E and a linking height J can be in a range between about 2:1 and about 5:1. In other embodiments, a ratio between the body height E and a linking height J can be in a range between about 2:1 and about 4:1, or in a range between about 3:1 and about 4:1 in other embodiments. In some embodiments, a ratio between the body height E and a linking height J can be about 7:2.

In some embodiments, a ratio between the arm width B and the body width A can be at least about 1:10, or at least about 1:5 in other embodiments. In some embodiments, a ratio between the arm width B and the body width A can be in a range between about 1:10 and about 1:3. In some embodiments, a ratio between the arm width B and the body width A can be in a range between about 1:5 and about 1:3, or between about 1:5 and about 1:4 in other embodiments. In some embodiments, a ratio between the arm width B and the body width A can be at most about 1:3.

In some embodiments, a ratio between the body width A and the body length C can be at least about 5:3, at least about 5:2 in other embodiments, or at least about 3:1 in yet other embodiments. In some embodiments, a ratio between the body width A and the body length C can be at most about 4:1, or at most about 7:2 in other embodiments. In some embodiments, a ratio between the body width A and the body length C can be in a range between about 5:1 and about 1:1. In some embodiments, a ratio between the body width A and the body length C can be in a range between about 5:1 and about 2:1, or between about 5:1 and about 5:2 in other embodiments. In yet other embodiments, a ratio between the body width A and the body length C can be in a range between about 4:1 and about 3:1, or between about 7:2 and about 3:1 in other embodiments.

In some embodiments, a ratio between the body width A and the body height E can be at least about 2:1, or at least about 3:1 in other embodiments. In some embodiments, a ratio between the body width A and the body height E can be at most about 5:1, or at most about 4:1 in other embodiments. In some embodiments, a ratio between the body width A and the body height E can be in a range between about 1:1 and about 5:1, or between about 2:1 and about 4:1 in other embodiments. In some embodiments, a ratio between the body width A and the body height E can be in a range between about 3:1 and about 4:1, or between about 2:7 and about 4:1 in other embodiments.

In some embodiments, a ratio between the channel height F and the arm height D can be at least about 1:10, or at least about 1:3 in other embodiments. In some embodiments, a ratio between the channel height F and the arm height D can be at most about 1:1, or at most about 1:2 in other embodiments. In some embodiments, a ratio between the channel height F and the arm height D can be in a range between about 1:10 and about 1:1. In some embodiments, a ratio between the channel height F and the arm height D can be in a range between about 1:4 and about 3:4, or between about 1:4 and about 1:2 in other embodiments. In some embodiments, a ratio between the channel height F and the arm height D can be about 1:2.

In some embodiments, a ratio between the body thickness H and the linking height J can be at least about 1:10, or at least about 1:4 in other embodiments. In some embodiments, a ratio between the body thickness H and the linking height J can be at most about 3:5, or at most about 1:3 in other embodiments. In some embodiments, a ratio between the body thickness H and the linking height J can be in a range between about 1:10 and about 1:2, or between about 1:5 and about 2:5 in another embodiment. In some embodiments, a ratio between the body thickness H and the linking height J can be in a range between about 1:4 and about 1:3. In some embodiments, a ratio between the body thickness H and the linking height J can be about 1:3.

In some embodiments, a ratio between the roller path thickness G and the body height E can be at least about 1:10, or at least about 1:4 in other embodiments. In some embodiments, a ratio between the roller path thickness G and the body height E can be at most about 1:2, or at most about 1:3 in other embodiments. In some embodiments, a ratio between the roller path thickness G and the body height E can be in a range between about 1:10 and about 1:2, or between about 1:10 and about 1:3 in other embodiments. In some embodiments, a ratio between the roller path thickness G and the body height E can be in a range between about 1:5 and about 3:10, or between about 1:4 and about 3:10 in other embodiments. In some embodiments, a ratio between the roller path thickness G and the body height E can be about 1:4.

Track pads having the ratios of dimensions described herein can help maximize usable life of components making up track assemblies and minimizing weight and materials to the extent possible. Various embodiments of the track pad 20, for example, allow the track pad alone to contact other machine components, such as drive wheels, idlers, and rollers, without exposing the links in the endless chain to such wear.

Figure 11:
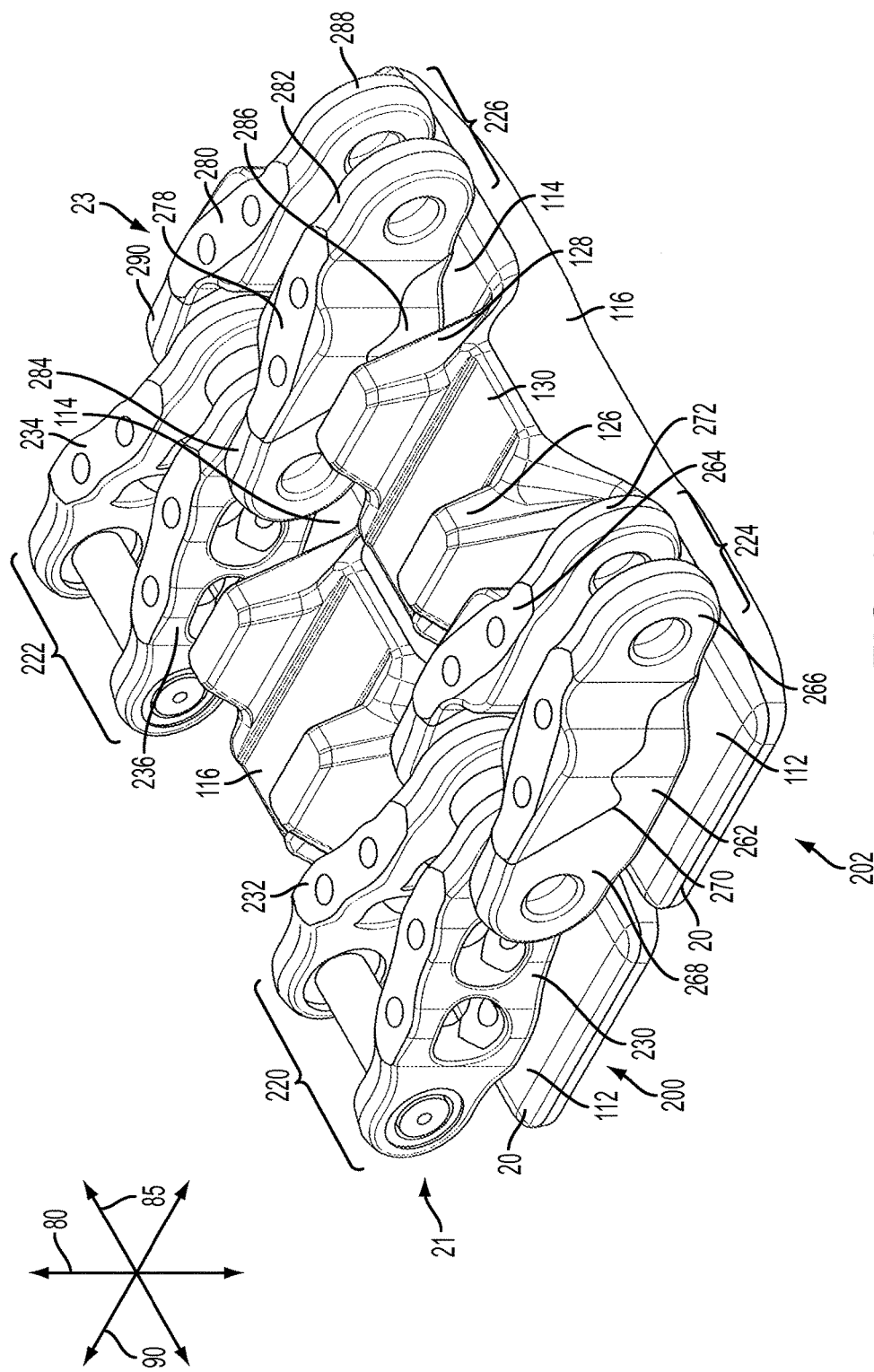
FIG. 11 is a perspective view of another embodiment of a portion of a track assembly in accordance with the disclosure including a master track segment.
Figure 12:
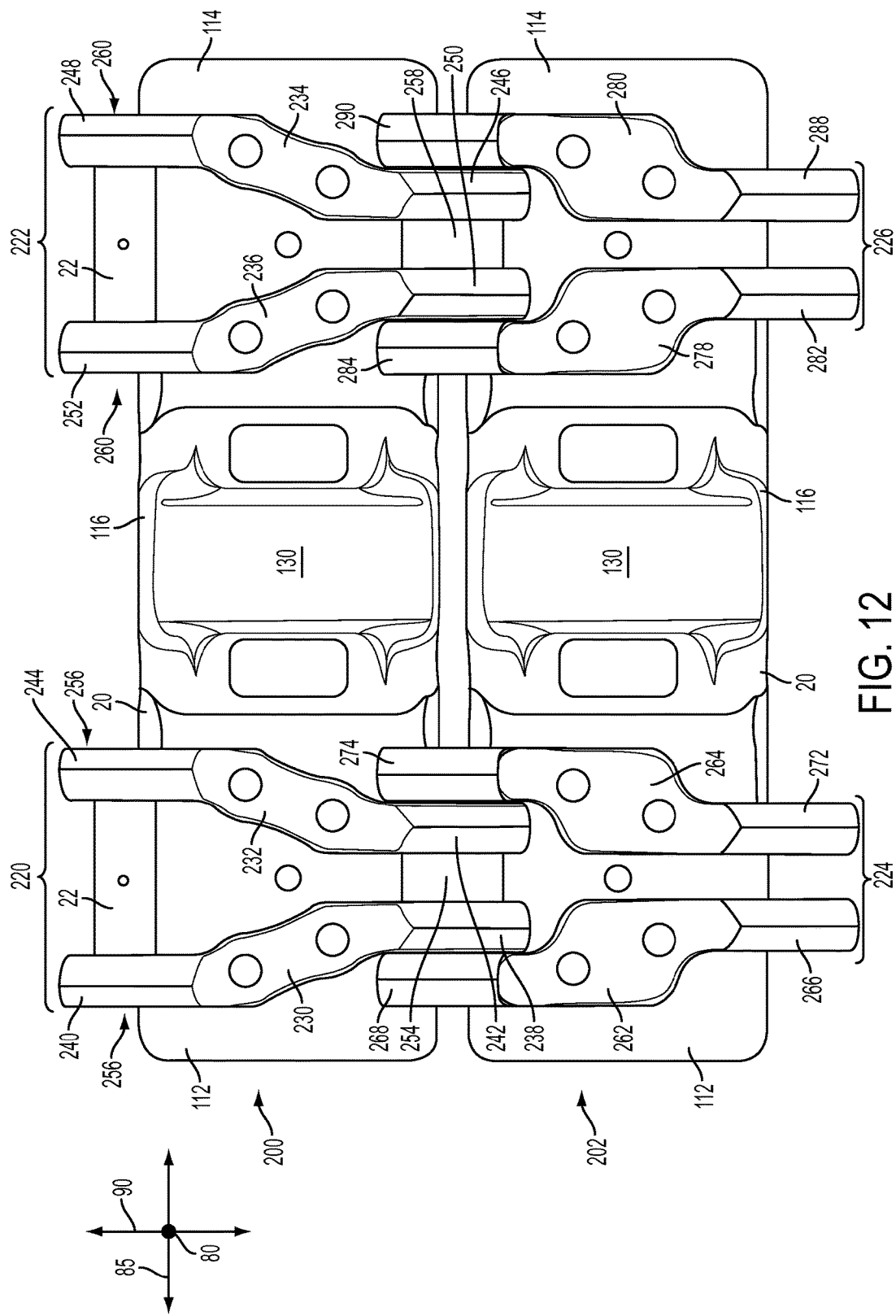
FIG. 12 is a top view of the portion of a track assembly of FIG. 11.

FIGS. 11 and 12 show another embodiment of a portion of the track assembly 16. Specifically, FIG. 11 shows a standard track link segment 200 and a master track segment 202 pivotally coupled to one another as a portion of the track assembly 16. The portion of the track assembly 16 shown in FIG. 11 shows only two track segments 200, 202 connected by portions of first endless chain 21 and second endless chain 23, but it is to be understood that the portions shown in FIG. 11 are merely for ease of illustration and that an entire endless loop track assembly is contemplated. Both the standard track link segment 200 and the master track segment 202 include track pads 20 like the track pads described above in reference to FIGS. 2-10, where like reference numbers represent like features. Each track pad 20 can include a first link engaging surface 112, a second link engaging surface 114, and a lug 116 protruding from between the first and second link engaging surfaces. The lugs 116 can each include a first arm 126 and a second arm 128 that protrude above a roller path surface 130. The lug 116 can protrude vertically so as to enable the lug to periodically engage with the drive wheel 18 of the machine 10 in order drive the track assembly 16. The track pads 20 can also each include ground engaging surface 118 disposed on opposite the first and second link engaging surfaces 112, 114. In the embodiment shown in FIG. 11, the lug 116 protrudes between the first and second link engaging surfaces 112, 114 and above the link engaging surfaces along the normal axis 80 with respect to the ground engaging surface 118.

The endless chains 21, 23 can be made up of a plurality of first pairs of links 220 and a plurality of second pairs of links 222 arranged end to end. Each track link segment 200 comprises one track pad 20, a first pair of links 220 that can be disposed on the first link engaging surface 112 of the track pad, and a second pair of links that can be disposed on the second link engaging surface 114 of the track pad.

At least one of the track link segments in a track assembly 16 can be a master track segment 202. The master track segment 202 comprises a track pad 20, a first pair of master links 224 that can be disposed on the first link engaging surface 112 of the track pad 20, and a second pair of master links 226 that can be disposed on the second link engaging surface 114 of the track pad. The pairs of master links 224, 226 of the master track segment 202 can allow for deconstruction of the track assembly 16 for repair, replacement of parts, or any other suitable reason. Generally, a track assembly 16 will include a single master track segment 202 among a plurality of standard track link segments 200, but track assemblies with a plurality of master track segments are also contemplated herein.

FIG. 12 shows a top view of the portion of the track assembly 16, specifically showing one track link segment 200 and one master track segment 202. The first pair of links 220 in the track link segment 200 can include a first outer link 230 and a first inner link 232, and the second pair of links 222 can include a second outer link 234 and a second inner link 236. The first inner link 232 can be laterally and substantially symmetrically spaced apart from the first outer link 230 along the lateral axis 85, and the second inner links 236 can be laterally and substantially symmetrically spaced apart from the second outer links 234 along the lateral axis. The first outer link 230 can have an outer bushing end 238 and an outer pin end 240 opposite one another, and the first inner link 232 can have an inner bushing end 242 and an inner pin end 244 opposite one another. The outer bushing end 238 of the first outer link 230 can be substantially aligned with the inner bushing end 242 of the first inner link 232 so as to allow for a first bushing 254 to connect the inner and outer bushing ends of the first pair of links 220. The outer pin end 240 of the first outer link 230 can be substantially aligned with the inner pin end 244 of the first inner link 232 so as to allow for a pin 22 to fit within a pin bore 256 formed through the outer pin end 240 and the inner pin end 244.

Similarly, the second outer link 234 can have an outer bushing end 246 and an outer pin end 248 opposite one another, and the second inner link 236 can have a inner bushing end 250 and a inner pin end 252 opposite one another. The outer bushing end 246 of the second outer link 234 can be substantially aligned with the inner bushing end 250 of the second inner link 236 so as to allow for a second bushing 258 to connect the inner and outer bushing ends of the second pair of links 222. The outer pin end 248 of the second outer link 234 can be substantially aligned with the inner pin end 252 of the second inner link 236 so as to allow for a pin 22 to fit within a pin bore 260 formed through the outer pin end 248 and the inner pin end 252.

The first pair of master links 224 can include a first left master link 262 and a first right master link 264. The first left master link 262 can include a left bushing portion 266 and a left pin portion 268 mated to one another along a first left mating interface 270. The first right master link 264 can include a right bushing portion 272 and a right pin portion 274 mated to one another along a first right mating interface 276. The first left master link 262 and the first right master link 264 can be laterally spaced apart from one another such that the left and right bushing portions 266, 272 are substantially aligned with one another along the lateral axis 85 and the left and right pin portions 268, 274 are substantially aligned with one another along the lateral axis. In some embodiments, a first bushing 273 can connect the left and right bushing portions 266, 272 to one another.

Similarly, the second pair of master links 226 can include a second left master link 278 and a second right master link 280. The second left master links 278 can include a left bushing portion 282 and a left pin portion 284 mated to one another along a second left mating interface 286. The second right master link 280 can include a right bushing portion 288 and a right pin portion 290 mated to one another along a second right mating interface 292. The second left master link 278 and the second right master link 280 can be laterally spaced apart from one another such that the left and right bushing portions 282, 288 are substantially aligned with one another along the lateral axis 85 and the left and right pin portions 284, 290 are substantially aligned with one another along the lateral axis. In some embodiments, a second bushing 293 can connect the left and right bushing portions 282, 288 to one another.

Referring again to FIGS. 11 and 12, the inner and outer bushing ends 238, 242 of the first pair of links 220 can fit between and be aligned with the inner and outer pin ends 244, 240 of an adjacent first pair of link. A plurality of pins 22 can connect a plurality of first pairs of links 220 to adjacent first pairs of links in the first endless chain 21 by fitting through the inner and outer bushing ends 242, 238 of the first pairs of links 220 and through the inner and outer pin ends 244, 240 of adjacent first pairs of links 220. In some embodiments, each pin 22 can be secured within the pin bores 256 of first pair of links 220 and fit through the first bushing 254 so as to create a pivotal connection between adjacent first pairs of links. Similarly, the inner and outer bushing ends 250, 246 of the second pair of links 222 can fit between and be aligned with the inner and outer pin ends 252, 248 of adjacent second pairs of links. A plurality of pins 22 can connect a plurality of second pairs of links 222 to adjacent second pairs of links in the second endless chain 23 by fitting through the inner and outer bushing ends 250, 246 of the second pairs of links 222 and through the inner and outer pin ends 252, 248 of adjacent second pairs of links 222. In some embodiments, each pin 22 can be secured within the pin bores 260 of second pair of links 222 and fit through the second bushing 258 so as to create a pivotal connection between adjacent second pairs of links.

Although the description of the first and second pairs of links 220, 222 and the inner links and outer links 230, 232, 234, 236 are described separately, it should be understood that, in some embodiments each of these links can be shaped substantially identical to one another. For example, the first endless chain 21 can be substantially identical to the second endless chain 23, but disposed on the plurality of track pads 20 on opposite sides of the lugs 116. The inner links 232, 236 can be shaped substantially identically to the outer links 230, 234, but reversed in orientation so as to dispose the respective bushing ends and pin ends of the first and second pairs of links adjacent one. For ease of illustration and description, because the first and second endless chains are substantially identical, FIGS. 13-34 only illustrate components of the first pair of links. It should be understood from the foregoing that, although only components of one pair of links is illustrated, other pairs of links share substantially identical characteristics.

Figure 13:
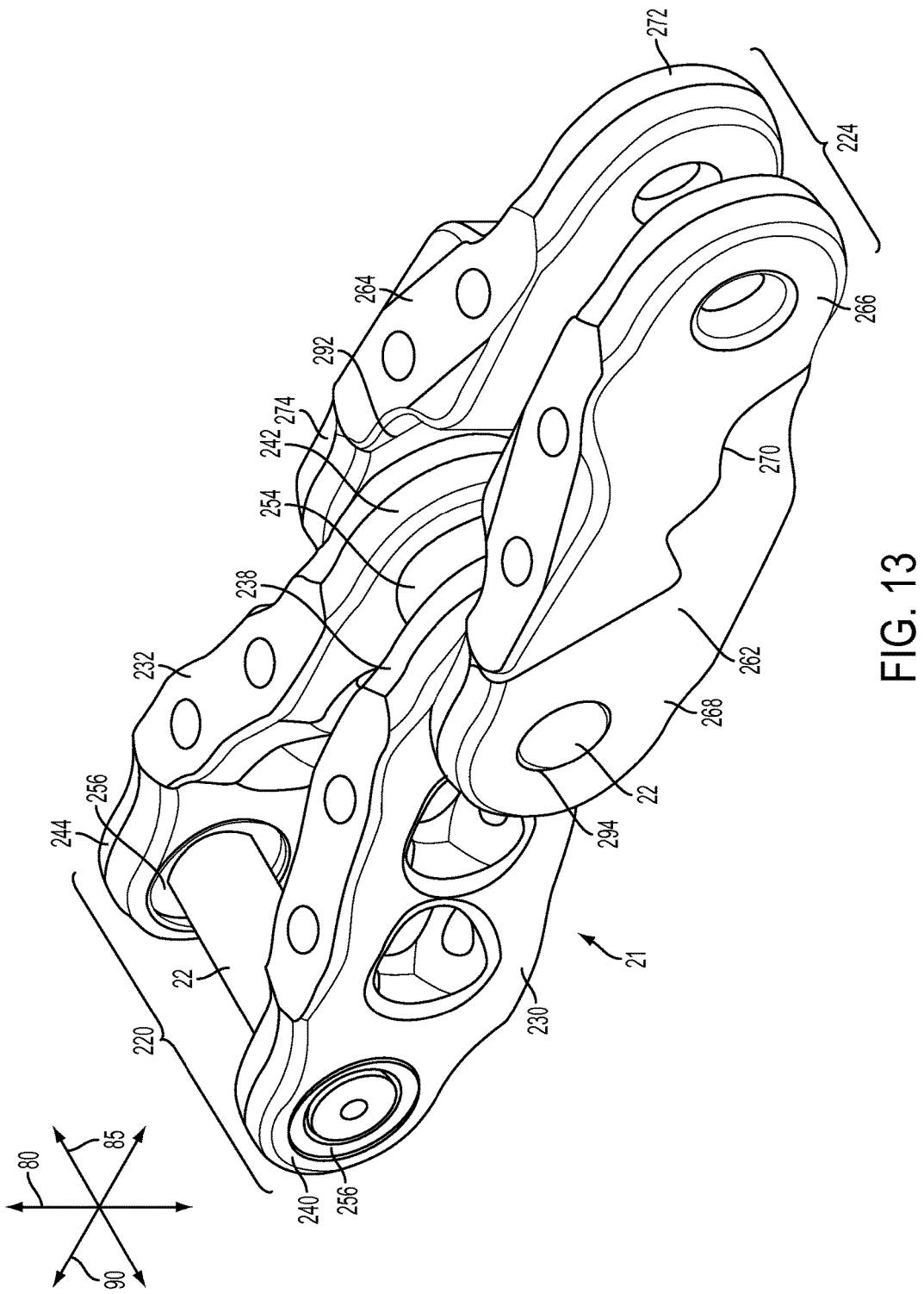
FIG. 13 is a perspective view taken from the top, front, and left side of a portion of an endless chain of the track assembly of FIG. 11.

FIG. 13 illustrates a portion of the first endless chain 21 including one of the plurality of first pair of links 220 and the first pair of master links 224. A pin 22 can fit within a master pin bore 294 formed through the left pin portion 268 and the right pin portion 274 first pair of master links 224. The inner and outer bushing ends 242, 238 of the first pair of links 220 can fit between the left pin portion 268 and the right pin portion 274 of the first pair of master links 224 such that the pin 22 can pivotally connect the first pair of links to the first pair of master links. The pin 22 can also pass through the first bushing 254 connecting the inner and outer bushing ends 242, 238 of the first pair of links 220. Another pin 22 can pass through the pin bore 256 to connect the inner and outer pin ends 244, 240 of the first pair of links 220 and provide a pivotal connection between an adjacent first pair of links.

Figure 14:
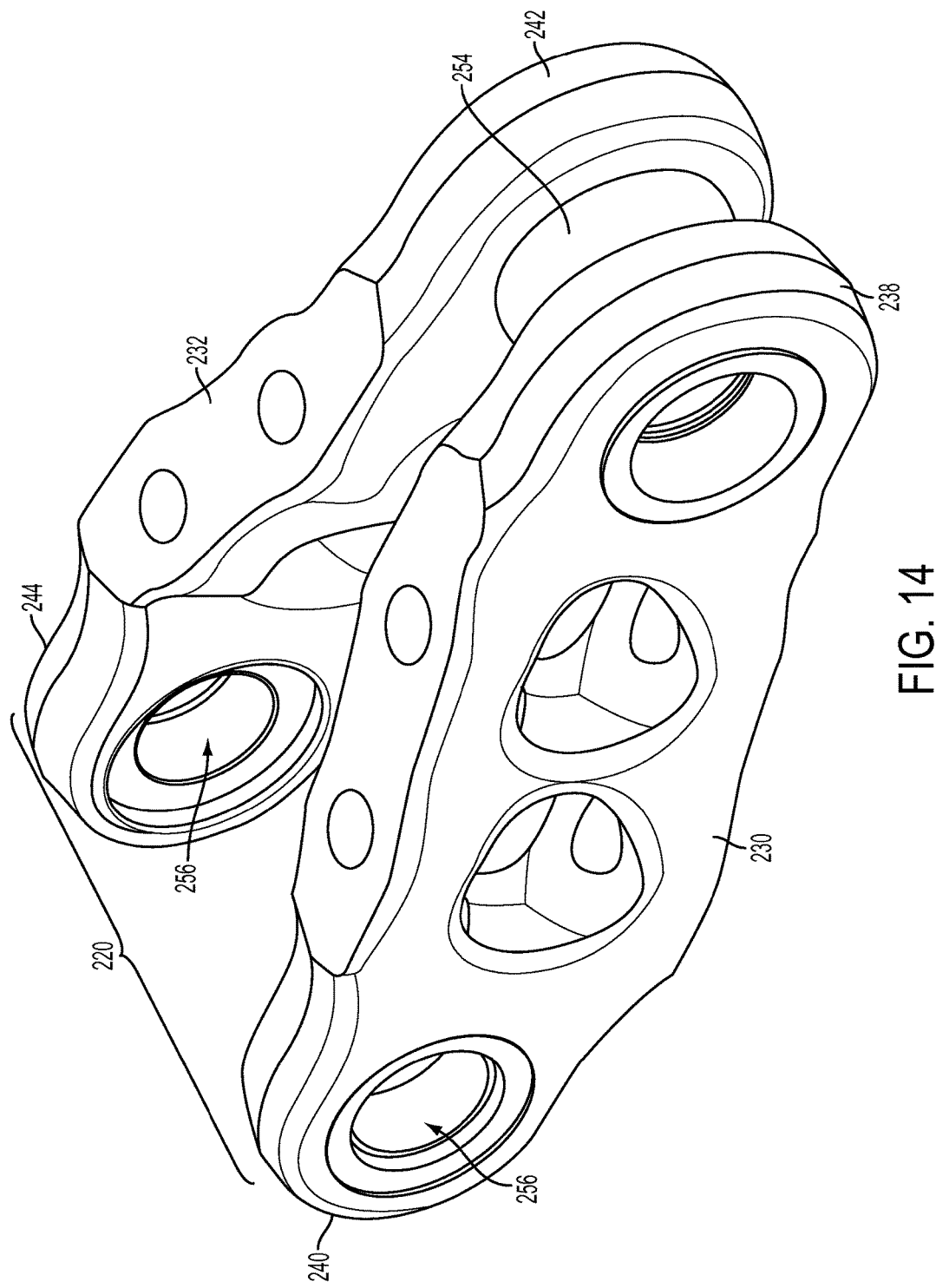
FIG. 14 is a pair of links of the endless chain of FIG. 13.
Figure 15:
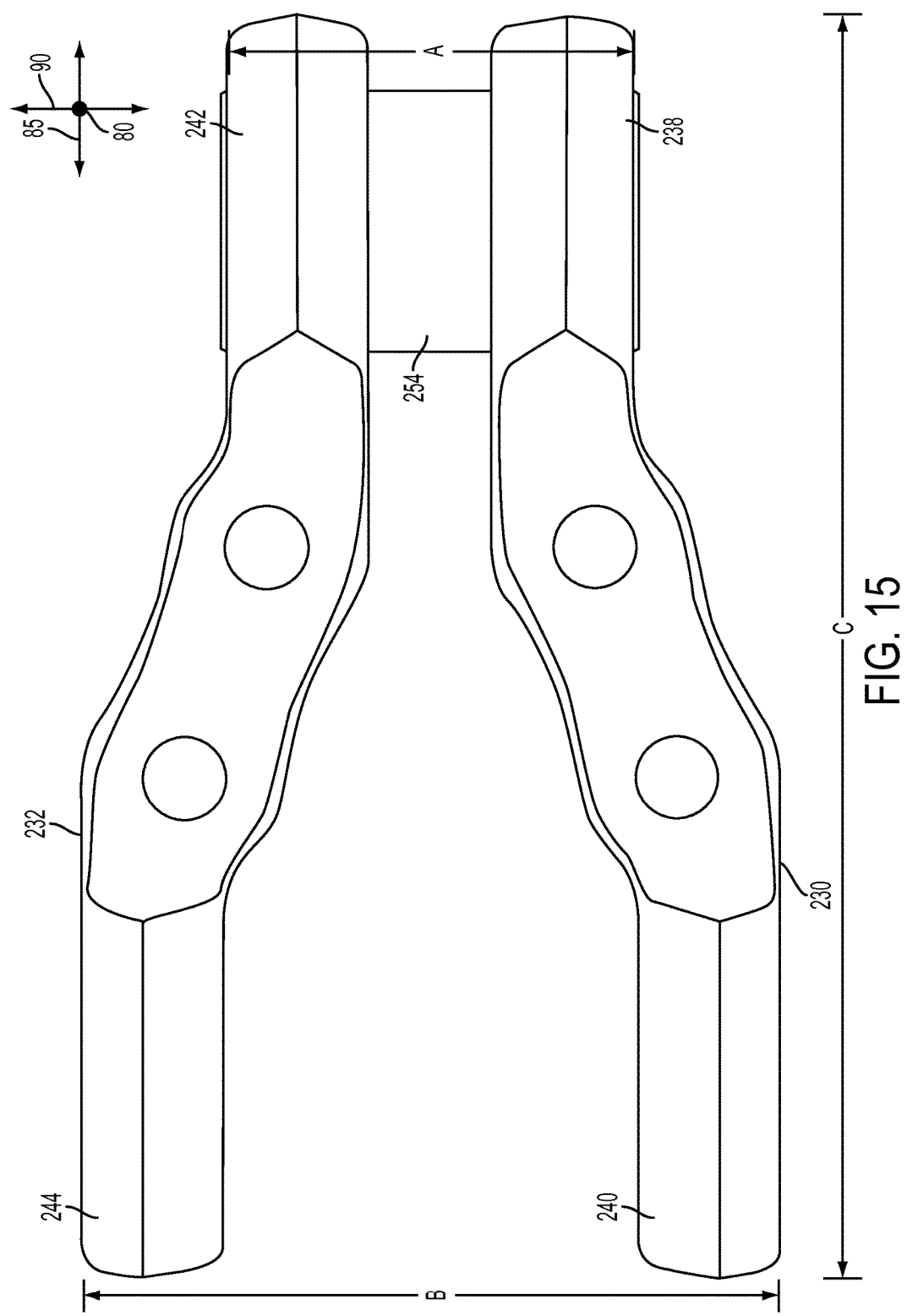
FIG. 15 is a top view of the pair of links of FIG. 14.

FIGS. 14 and 15 illustrate the first pair of links 220 detached from the track pad 20 and any other adjacent pairs of links. Although FIG. 14 shows the pin bore 256 passing through the inner and outer pin ends 244, 240, it is also contemplated that the pin 22 can be integral with the inner and outer links 230, 232 in some embodiments. As best shown in FIG. 15, a bushing end width A measured along the lateral axis 85 between the inner bushing end 242 of the first inner link 232 and the outer bushing end 238 of the first outer link 230 can be less than a pin end width B measured along the lateral axis 85 between the inner pin end 244 of the first inner link and the outer pin end 240 of the first outer link. Similarly, though not indicated in the figures, a second bushing end width measured along the lateral axis 85 between the inner bushing end 250 of the second inner link 236 and the outer bushing end 246 of the second outer link 234 is less than a second pin end width measured along the lateral axis between the inner pin end 252 of the second inner link and the outer pin end 248 of the second outer link. In some embodiments, a ratio of the bushing end width A to the pin end width B is more than about 1:2. In some embodiments, a ratio of the bushing end width A to the pin end width B is in a range between about 2:5 and about 4:5, and in a range between about 1:2 and about 3:5 in other embodiments.

A link length C can be measured along the longitudinal axis from the pin ends 240, 244 of the first inner and outer links 230, 232 to the bushing ends 238, 242. In some embodiments, a ratio between the pin end width B and the link length C is at least about 2:5, and at least about 1:2 in other embodiments. In some embodiments, a ratio of the pin end width B to the link length C is in a range between about 2:5 and about 4:5, and in a range between about 1:2 and about 3:5 in other embodiments.

FIGS. 16-23 illustrate various views of a first outer link 230. However, as described above, in some embodiments, the geometries and depiction of the first outer link 230 can represent all the links in the plurality of first and second pairs of links, including the first inner links 232, the second outer links 234, and the second inner links 236. Thus, it should be understood that each link in a standard track link segment can be substantially interchangeable.

The link 230 can have a central portion 241 disposed between the pin end 240 and the bushing end 238. Referring now to FIGS. 18 and 19, the central portion 241 can connects the pin end 240 to the bushing end 238 such that the pin end and the bushing end are substantially offset from one another along the lateral axis 85. In some embodiments, the pin end 240 and the bushing end 238 can be substantially parallel, though offset by the central portion. The central portion 241 can define an upper surface 243 and a lower surface 245 opposite and substantially parallel to one another. Depending on how the link 230 is oriented with respect to a track pad 20, either the upper surface 243 or the lower surface 245 can be engaged against the first or second link engaging surfaces 112, 114 of the track pad.

Figure 16:
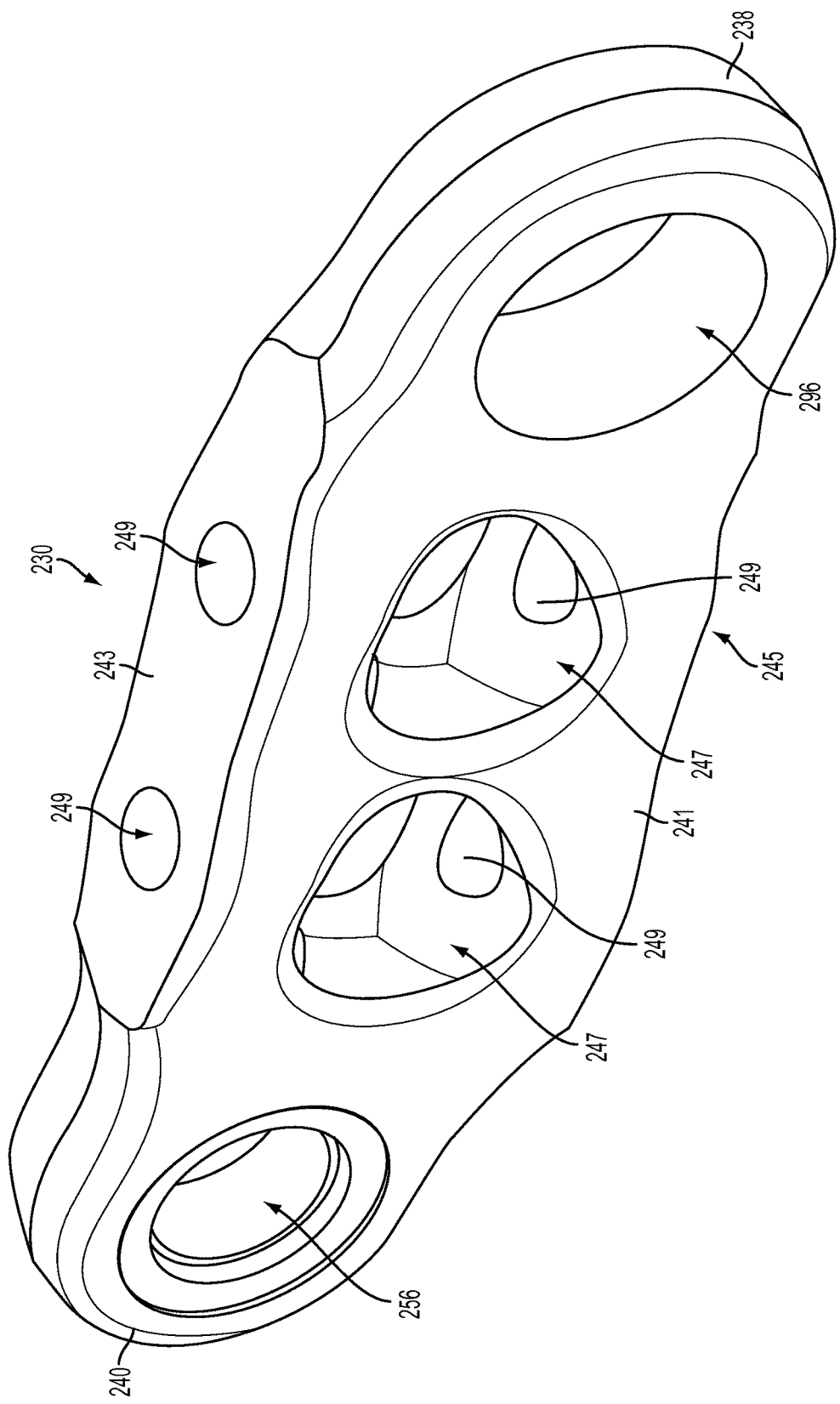
FIG. 16 is a perspective view taken from the top, front, and left side of a link of the pair of links of FIG. 14.
Figure 17:
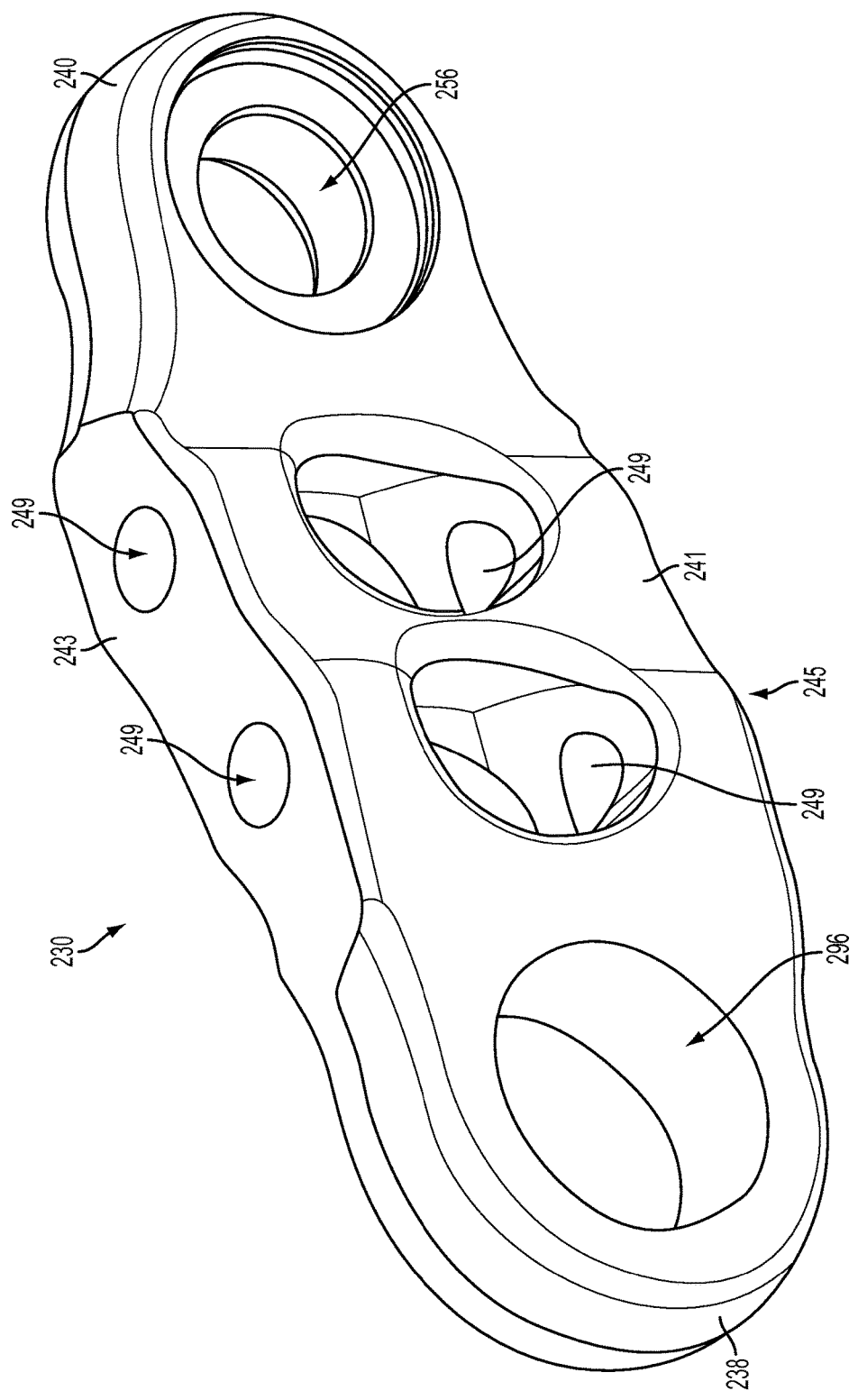
FIG. 17 is another perspective view taken from the top, front, and right side of the link of FIG. 16.

Referring now to FIGS. 16, 17, 20, and 21, the link 230 can include a bushing bore 296 formed through the bushing end 238. In some embodiments, the first bushing 254 can be press-fit or otherwise secured within the bushing bore 296. In other embodiments, however, it is contemplated that the first and second bushings 254, 258 can be integral to the first and second pairs of links 220, 222. The link 230 can also include a pin bore 256 formed through the pin end 240. In some embodiments, a pin 22 can be press-fit or otherwise secured within the pin bore 256, or the pin 22 can be integral with the links in other embodiments. At least one fastener access 247 can be formed through the central portion 241 of the link 230. Although the embodiment shown in the figures shows two fastener accesses, more or few fastener accesses are contemplated herein. As best shown in FIGS. 16 and 17, at least one fastener hole 249 can be formed in the central portion 241 between the fastener accesses 247 and the upper surface 243, or the fastener accesses and the lower surface 245. At least one fastener, such as a bolt, screw, rivet, or any other suitable fastener, can fit through the fastener holes 249 and secure the link 230 to the link engaging surfaces 112, 114 of the track pad 20. Although FIGS. 16 and 17 show four fastener holes 249 formed through the link 230, in some embodiments it is contemplated that fastener holes 249 would only be formed through the lower surface 245 if the lower surface of the link 230 were to be disposed on the link engaging surface 112, 114 of the track pad 20. Similarly, in some embodiments it is contemplated that fastener holes 249 would only be formed through the upper surface 243 if the upper surface of the link 230 were to be disposed on the link engaging surface 112, 114 of the track pad 20.

Figure 23:
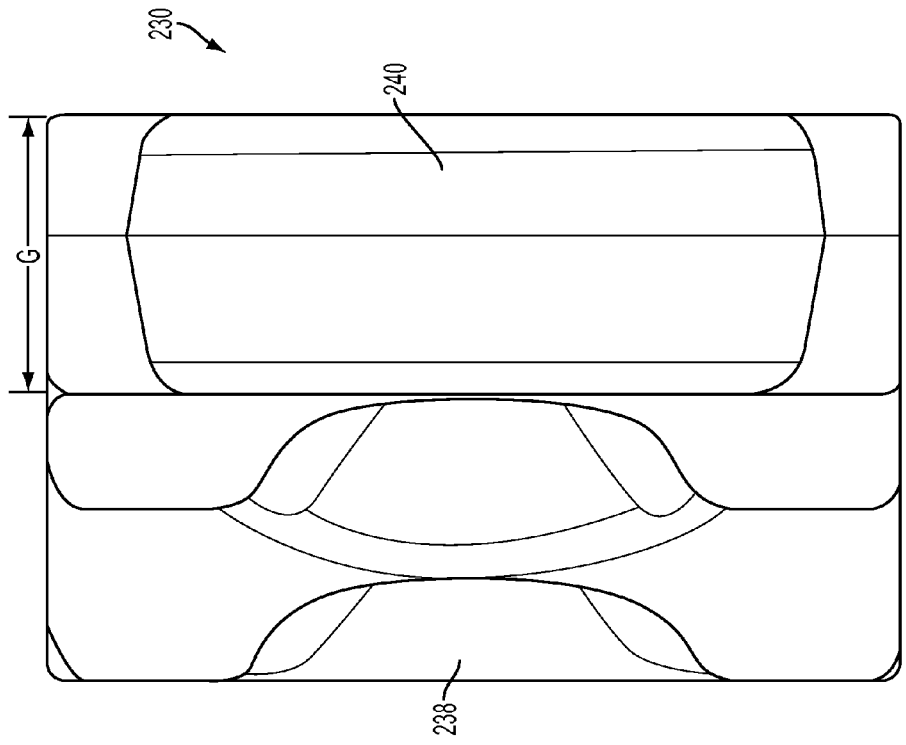
FIG. 23 is a rear view of the link of FIG. 16.
Figure 22:
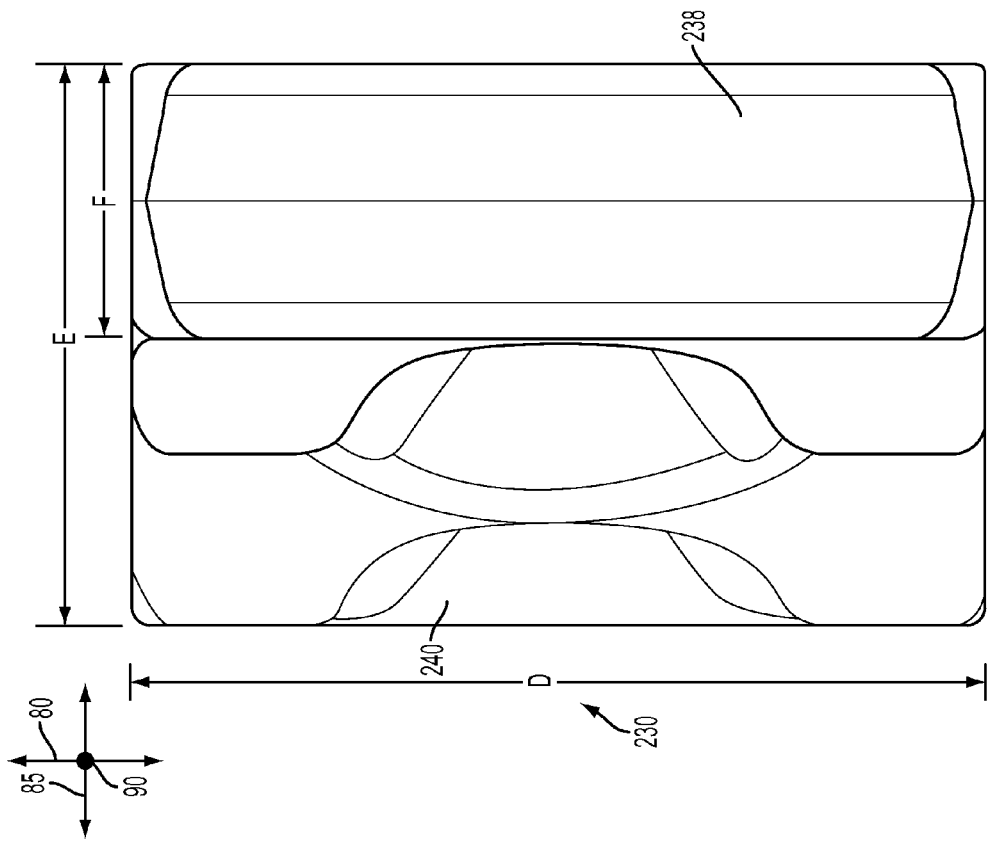
FIG. 22 front view of the link of FIG. 16.

Referring now to FIGS. 22 and 23, a link height D can be measured along the normal axis 80 between the lower surface 245 and the upper surface 243, and an overall link width E can be measured along the lateral axis 85 between the pin end 240 and the bushing end 238. A bushing end thickness F can be measured along the lateral axis 85, and a pin end thickness G can be measured along the lateral axis. In some embodiments, a ratio of the overall link width E to the link height D can be at least about 1:2, and at least about 7:10 in other embodiments. In some embodiments, a ratio of the overall link width E to the link height D can be in a range between about 1:2 and about 1:1, between about 7:10 and about 4:5 in other embodiments, and between about 7:10 and about 3:4 in other embodiments. In some embodiments, a ratio of the bushing end thickness F to overall link width E can be at least about 1:4, and at least about 2:5 in other embodiments. In other embodiments, a ratio of the bushing end thickness F to overall link width E can be in a range between about 3:7 and about 3:5, and between about 2:5 and about 1:2 in other embodiments. In some embodiments, the bushing end thickness F and the pin end thickness G can be substantially equal to one another.

In some embodiments, each of the links 230, 232, 234, 236 can each have a substantially uniform hardness. In some embodiments, the Rockwell hardness of each of the links 230, 232, 234, 236 can be less than about HRC 50. In other embodiments, the Rockwell hardness of each of the links 230, 232, 234, 236 can be in a range between about HRC 30 and HRC 40, and in a range between about HRC 33 and about HRC 40 in other embodiments.

Figure 24:
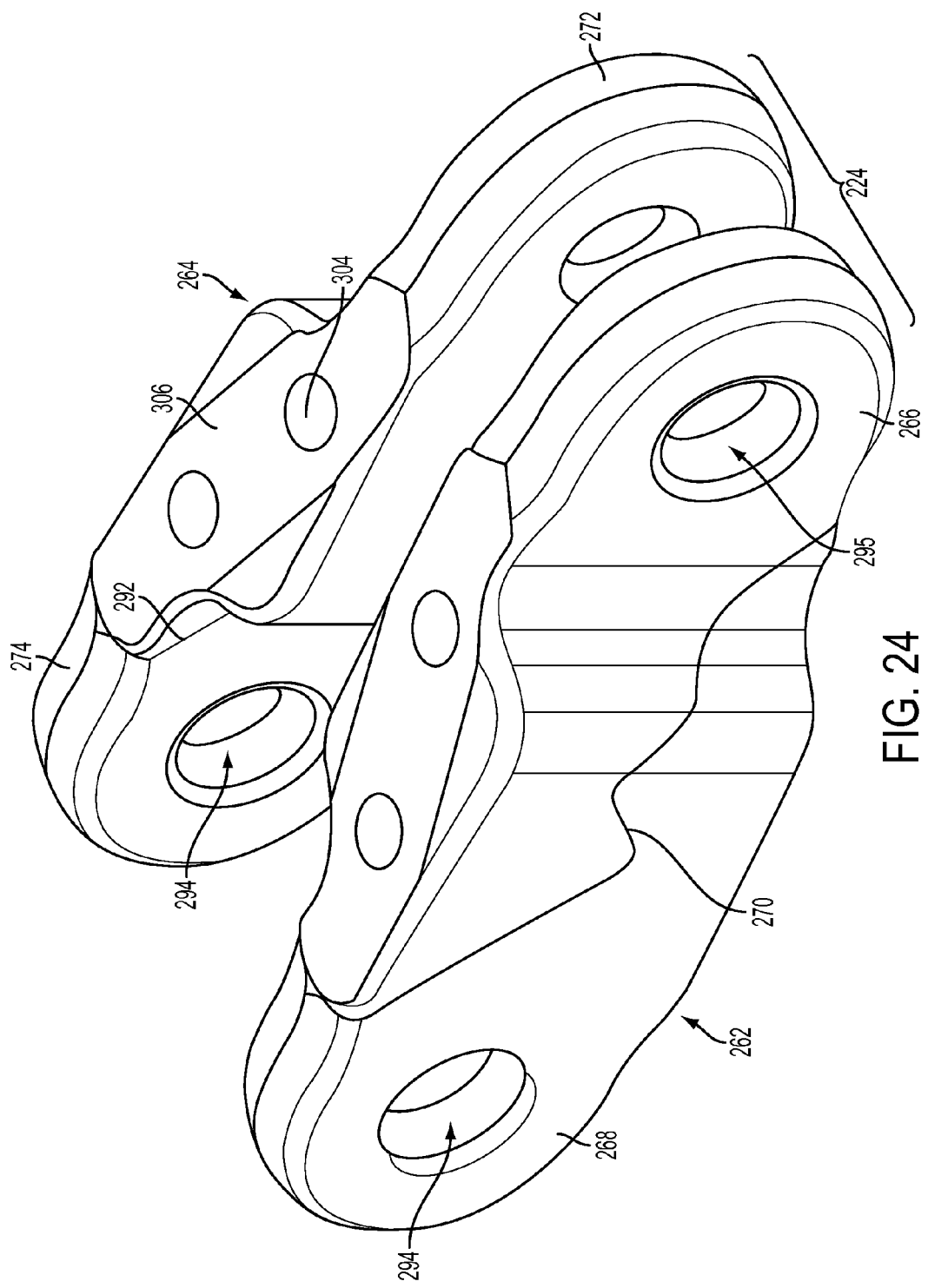
FIG. 24 is a perspective view taken from the top, front, and left side of a pair of master links of the endless chain of FIG. 13.

FIG. 24 shows a detached first pair of master links 224. As described above, however, it should be understood that the second pair of master links 226 can be substantially identical to the first pair of master links 224. For ease of illustration, however, FIGS. 24-34 refer only to components of the first pair of master links 224.

Figure 25:
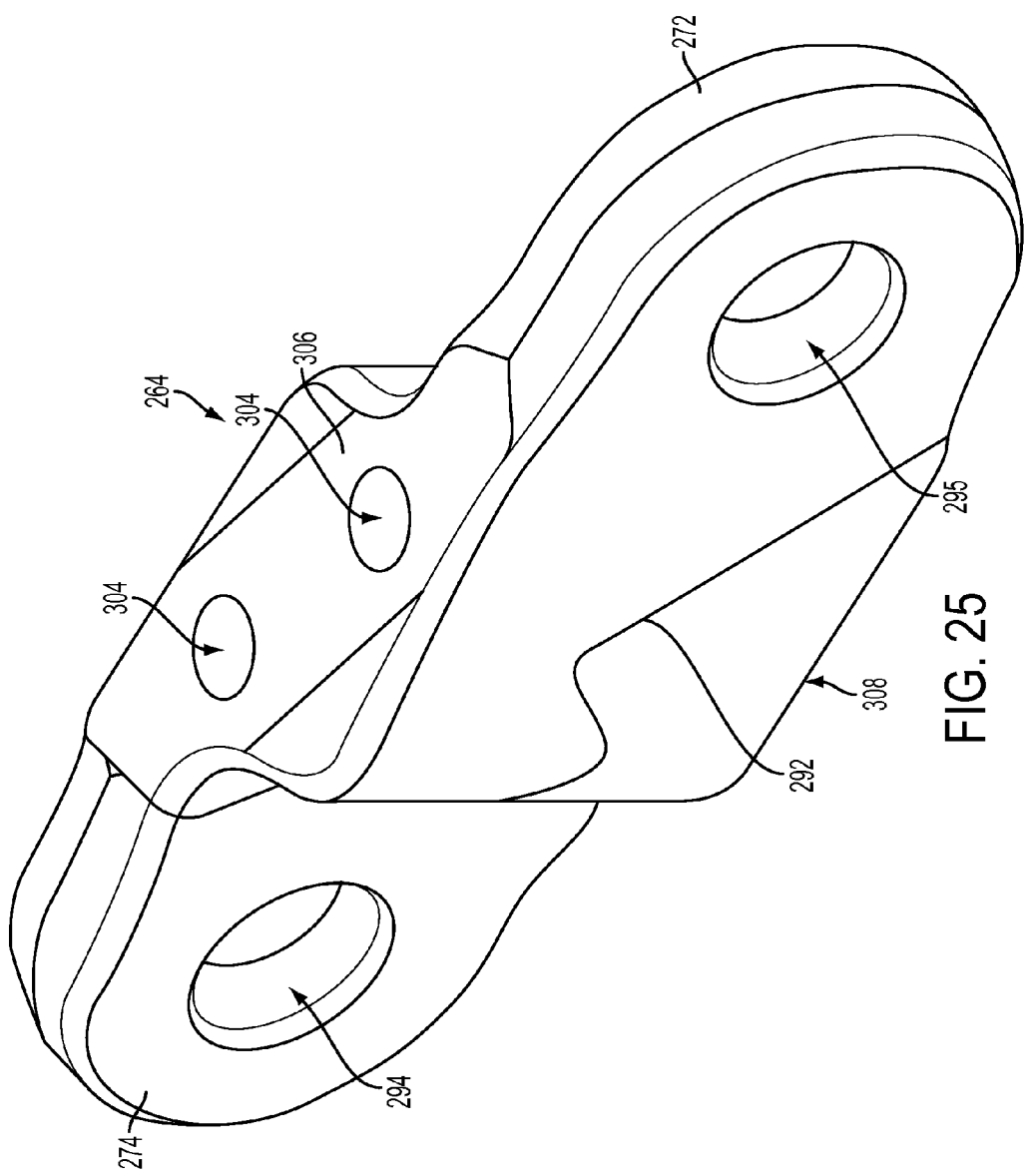
FIG. 25 is a perspective view taken from the top, front, and left side of a right master link of the pair of master links of FIG. 24.
Figure 26:
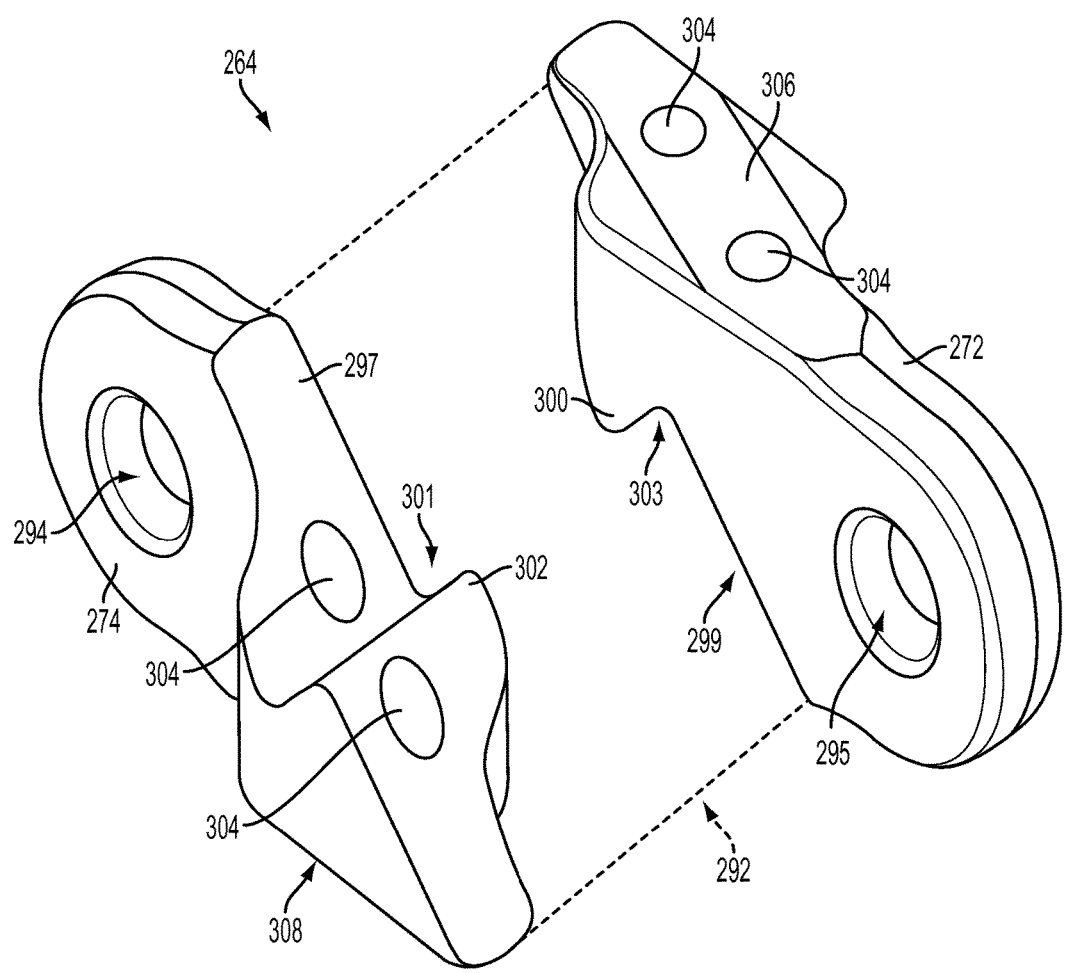
FIG. 26 is an exploded view of the right master link of FIG. 25.

FIG. 25 shows the right pin portion 274 mated together with the right bushing portion 272 to form the right master link 264. A master pin bore 294 can be formed through the right pin portion 274 into which a pin 22 can be press-fit, adhered, or otherwise secured. A master bushing bore 295 can be formed through the bushing end 272 into which a bushing 273 can be press-fit, adhered, or otherwise secured. FIG. 26 shows an exploded view of the right master link 264 to better illustrated the right mating interface 292 between the right pin portion 274 and the right bushing portion 272. The right pin portion 274 includes a contoured right pin engagement surface 297 that defines a right pin mating tooth 302 and a right pin mating channel 301. The right bushing portion 272 includes a contoured right bushing engagement surface 299 that defines a right bushing mating tooth 300 and a right bushing mating channel 303. When the right pin portion 274 and the right bushing portion 272 are in mating relationship with one another, the right pin engagement surface 297 engages the right bushing engagement surface 299 such that the right pin mating tooth 302 engages with the right bushing mating channel 303, and the right bushing mating tooth 300 engages with the right pin mating channel 301. At least one fastener hole 304 can be formed through the right master link from a master upper surface 306 to a master lower surface 308. As best seen in FIG. 26, the fastener holes 304 can be formed through both the right pin portion 274 and the right bushing portion 272 such that continuous fastener holes are formed when the right pin portion and the right bushing portion are in mating relationship with one another. Therefore, a fastener, such as a bolt, a screw, a rivet, or any other suitable fastener, can secure the right pin portion 274 to the right bushing portion 272. In some embodiments, a fastener can pass through both the right pin portion 274 and the right bushing portion 272 and secure the right master link 264 to the track pad 20 at the first or second link engaging surfaces 112, 114.

Figure 27:
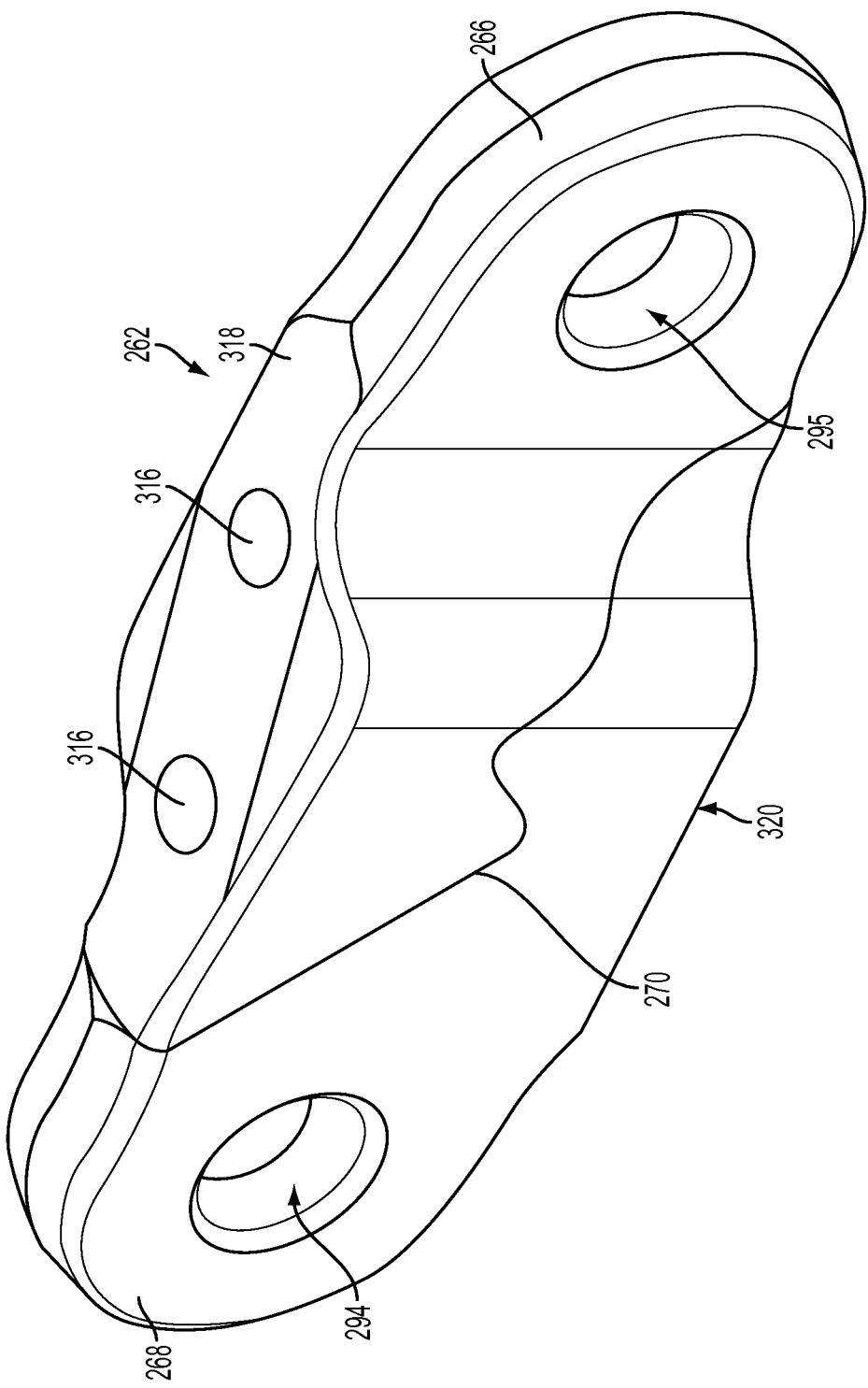
FIG. 27 is a perspective view taken from the top, front, and left side of a left master link of the pair of master links of FIG. 24.
Figure 28:
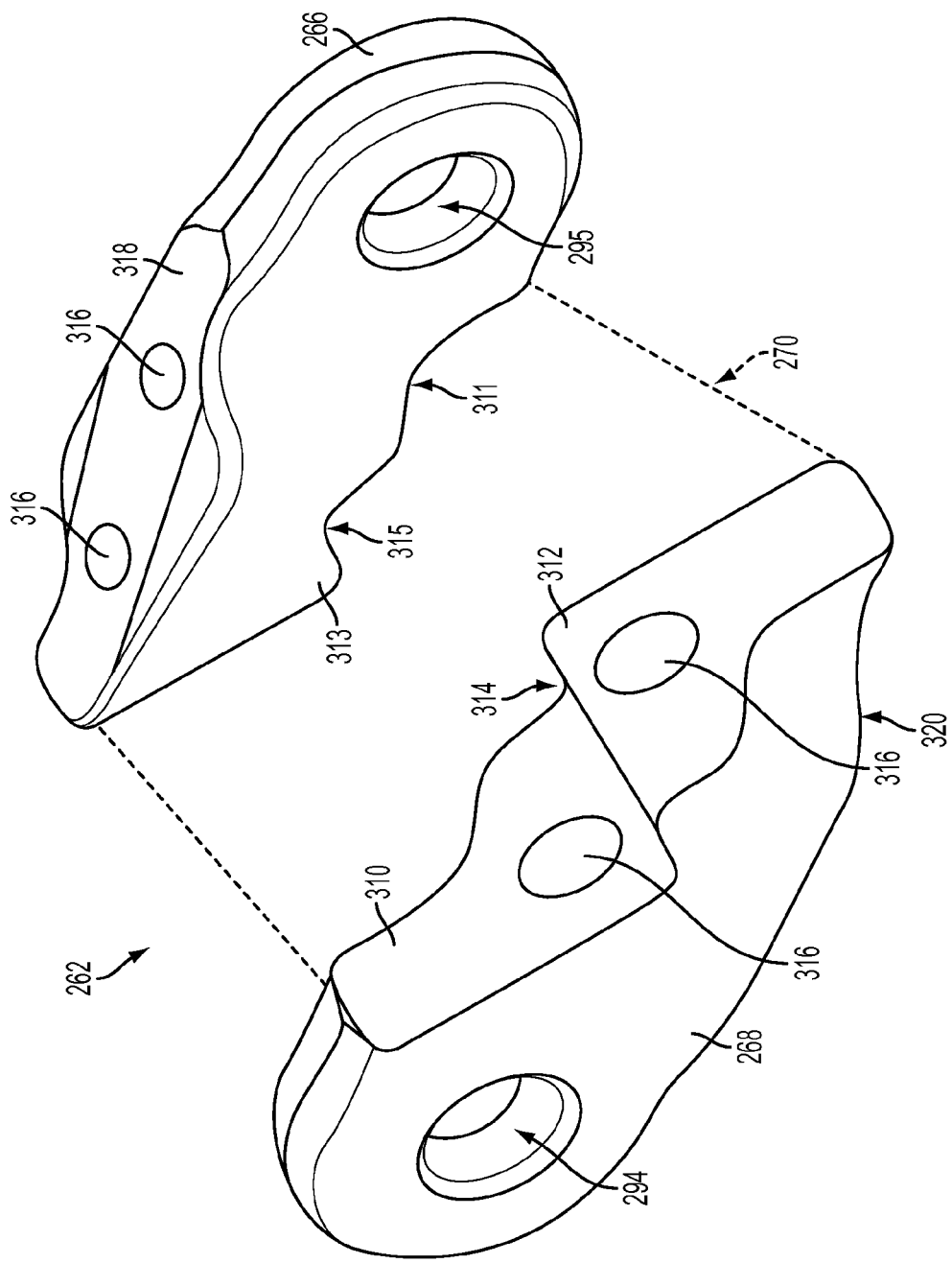
FIG. 28 is an exploded view of the left master link of FIG. 27.

FIG. 27 shows the left pin portion 262 mated together with the left bushing portion 266 to form the left master link 264. A master pin bore 294 can be formed through the left pin portion 268 into which a pin 22 can be press-fit, adhered, or otherwise secured. A master bushing bore 295 can be formed through the bushing end 272 into which a bushing 273 can be press-fit, adhered, or otherwise secured. FIG. 28 shows an exploded view of the left master link 264 to better illustrated the left mating interface 270 between the left pin portion 268 and the left bushing portion 266. The left pin portion 268 includes a contoured left pin engagement surface 310 that defines a left pin mating tooth 312 and a left pin mating channel 314. The left bushing portion 266 includes a contoured left bushing engagement surface 311 that defines a left bushing mating tooth 313 and a left bushing mating channel 315. When the left pin portion 268 and the left bushing portion 266 are in mating relationship with one another, the left pin engagement surface 310 engages the left bushing engagement surface 311 such that the left pin mating tooth 312 engages with the left bushing mating channel 315, and the left bushing mating tooth 313 engages with the left pin mating channel 314. At least one fastener hole 316 can be formed through the left master link from a master upper surface 318 to a master lower surface 320. As best seen in FIG. 28, the fastener holes 316 can be formed through both the left pin portion 268 and the left bushing portion 266 such that continuous fastener holes are formed when the left pin portion and the left bushing portion are in mating relationship with one another. Therefore, a fastener, such as a bolt, a screw, a rivet, or any other suitable fastener, can secure the left pin portion 268 to the left bushing portion 266. In some embodiments, a fastener can pass through both the left pin portion 268 and the left bushing portion 266 and secure the left master link 264 to the track pad 20 at the first or second link engaging surfaces 112, 114.

FIGS. 29-34 show various other views of the left master link to more clearly illustrated the geometry of the disclosure.

In some embodiments, the components of the first and second master links 224, 226 can be constructed such that each of the left bushing portions 266, 282 of the first and second pairs of master links 224, 226 can be substantially identical to each of the right pin portions 274, 290 of the first and second pairs of master links. Further, in some embodiments, each of the left pin portions 268, 284 of the first and second pairs of master links 224, 226 can be substantially identical to each of the right bushing portions 272, 288 of the first and second pairs of master links. Thus, even though each of the first and second pairs of mater links 224, 226 uses up to eight separate pieces to construct the respective pairs of master links, the symmetry of the portions makes it possible to use only two separate forgings, molds, patterns, or other manufacturing process to create the eight portions. In some embodiments, the components of the first and second pair of master links 224, 226 can each have a substantially uniform hardness. For example, in one embodiment, the Rockwell hardness of each of the left and right master links of the first and second pairs of master links can be less than about HRC 50. In other embodiments, the Rockwell hardness can be in a range between about HRC 30 and about HRC 40, and in a range between about HRC 33 and about HRC 40 in other embodiments.

While the arrangement is illustrated in connection with a hydraulic excavator, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

The present disclosure is applicable to any track-type mobile machine. However, the described track pad and track assembly may be particularly applicable to larger machines using track-type treads for motion, in which the forces passing through the track assembly are significant and can affect longevity of the track assembly. This may be particularly important to machines that operate substantially non-stop, where downtime of the machine to implement repairs and maintenance can be costly to the machine owner.

The disclosed track assembly and track pad may provide improved component longevity and improved ease of replacement and maintenance. The track pad described herein reduces the complexity of traditional crawler shoes by separating the track joint into a track pad that includes a lug with a roller path and a ground engaging surface in a single component, and separate the chain links. The track pad can have link engaging surfaces on either end where chain link assemblies can be fastened to the track pad. In the described track assembly, the chain links may serve pin joint function, but may not be contacted by other machine components such as sprockets, idlers, or rollers. Thus, more durable, sealed, and lubricated joints are possible that are exposed to lower wear conditions throughout machine operation. Additionally, because the track pads are separate components from the links that comprise the chains, the track pads can be individually replaced by removing and replacing fasteners holding the track pads in place instead of deconstructing the entire tread. This can result in decreased machine downtime and increased machine efficiency.

Because the track pads alone make contact with the other machine components such as drive wheels, idlers, etc., another advantage of the present disclosure is provided in that the links making up the endless chains of the track assembly are exposed to much lower wear conditions than links that make contact with drive wheels and other machine components. In some embodiments of the present disclosure, the links making up the endless chains only contact the track pads to which the links are secured. As a result, the need to provide the links with wear surfaces that can withstand damaging exposure to moving machine components is alleviated. As a result, the links of the endless chains can be made with a relatively low and uniform hardness, with no preference as to which side of the link is oriented toward or away from the track pad or drive wheels. This can increase efficiency in production of the links because a single mold or forging can be used for both inner and outer links, as opposed to separate molds, forgings, patterns, or other manufacturing process, for each of the inner and outer links.

A further advantage of the present disclosure is increased efficiency in manufacturing and producing the sets of master links. Specifically, due to the symmetry in the different parts that make up the respective master links, the described pairs of master links can be produced using only two separate molds, forgings, patterns, or other manufacturing process.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A track link segment for a track assembly of a mobile machine, the track link segment comprising:
   a track pad having a ground engaging surface opposite first and second link engaging surfaces, a lug protruding between the first and second link engaging surfaces and above the first and second link engaging surfaces with respect to the ground engaging surface, the lug configured to periodically engage a drive wheel of the machine, a first arm disposed between the first link engaging surface and the lug, and a second arm disposed between the second link engaging surface and the lug, both the first and second arms protruding above the lug with respect to the ground engaging surface;
   a first pair of links disposed on the first link engaging surface of the track pad, the first pair of links including:
      a first outer link having an outer bushing end and an outer pin end, and
      a first inner link laterally and substantially symmetrically spaced apart from the first outer link, the first inner link having an inner bushing end and an inner pin end,
      wherein a distance between the inner bushing end of the first inner link and the outer bushing end of the first outer link is less than a distance between the inner pin end of the first inner link and the outer pin end of the first outer link;
   a second pair of links disposed on the second link engaging surface of the track pad, the second pair of links including:
      a second outer link having an outer bushing end and an outer pin end, and
      a second inner link laterally and substantially symmetrically spaced apart from the second outer link, the second inner link having an inner bushing end and an inner pin end,
      wherein a distance between the inner bushing end of the second inner link and the outer bushing end of the second outer link is less than a distance between the inner pin end of the second inner link and the outer pin end of the second outer link;

a first bushing connecting the first inner and outer links between the inner bushing end of the first inner link and the outer bushing end of the first outer link; and a second bushing connecting the second inner and outer links between the inner bushing end of the second inner link and the outer bushing end of the second outer link.

2. The track link segment of claim 1, wherein the first and second link engaging surfaces of the track pad are substantially co-planar.

3. The track link segment of claim 1, wherein the first inner link, the first outer link, the second inner link, and the second outer link each have a substantially uniform hardness.

4. The track link segment of claim 3, wherein the first inner link, the first outer link, the second inner link, and the second outer link each have a Rockwell hardness in a range between HRC 30 and HRC 40.

5. The track link segment of claim 1, wherein each of the first inner link, the first outer link, the second inner link, and the second outer link are fastened to the track pad with fasteners.

6. The track link segment of claim 1, wherein the inner bushing ends of the first and second pairs of links are substantially aligned with the respective outer bushing ends of the first and second pairs of links, and the inner pin ends of the first and second pairs of links are substantially aligned with the respective outer pin ends of the first and second pairs of links.

7. The track link segment of claim 6, further comprising a first pin disposed between the inner and outer pin ends of the first pair of links and a second pin disposed between the inner and outer pin ends of the second pair of links.

8. A track assembly for a mobile machine, the track assembly comprising:

a plurality of track pads, each track pad comprising a ground engaging surface opposite first and second link engaging surfaces, a lug protruding between the link engaging surfaces above the link engaging surfaces with respect to the ground engaging surface, the lug configured to periodically engage a drive wheel of the machine, a first arm disposed between the first link engaging surface and the lug, and a second arm disposed between the second link engaging surface and the lug, both the first and second arms protruding above the lug with respect to the ground engaging surface;

a plurality of first and second pairs of links, the first pairs of links disposed on the first link engaging surfaces of the track pads and the second pairs of links disposed on the second link engaging surfaces of the track pads, each of the first and second pairs of links comprising:

an outer link having an outer bushing end and an outer pin end, and an inner link laterally and substantially symmetrically spaced-apart from the outer link, the inner link having an inner bushing end and an inner pin end, wherein a distance between the inner bushing ends of the inner links and the respective outer bushing ends of the outer links is less than a distance between the inner pin ends of the inner links and the respective outer pin ends of the outer links; and a plurality of pins connecting the inner and outer bushing ends of first pairs of links to the inner and outer pin ends of adjacent first pairs of links so as to form a first endless chain and connecting the inner and outer bushing ends of the second pairs of links to the inner and outer pin ends of the adjacent second pairs of links so as to form a second endless chain;

wherein the first and second endless chains connect adjacent track pads in an endless loop.

9. The track assembly of claim 8, wherein the first and second link engaging surfaces of the track pad are substantially co-planar.

10. The track assembly of claim 8, wherein each of the inner and outer links of the first and second pairs of links have a substantially uniform hardness.

11. The track assembly of claim 10, wherein each of the inner and outer links of the first and second pairs of links have a Rockwell hardness in a range between HRC 30 and HRC 40.

12. The track assembly of claim 8, wherein each of the inner and outer links of the first and second pairs of links are fastened to the track pad with fasteners.

13. The track assembly of claim 8, wherein a plurality of first bushings connect the inner and outer bushing ends of each of the first pairs of links and a plurality of second bushings connect the inner and outer bushing ends of each of the second pair of links, the plurality of first and second bushings each forming pin bores through which the plurality of pins are pivotally received.

14. The track assembly of claim 8, wherein at least one set of the first and second pairs of links is a first pair of master links and a second pair of master links, the outer link of the first pair of master links and the inner link of the second pair of master links each being left master links comprising a left bushing portion and a left pin portion mated to one another along a left master mating interface, and the inner link of the first pair of master links and the outer link of the second pair of master links each being right master links comprising a right bushing portion and a right pin portion mated to one another along a right master interface.

15. The track assembly of claim 14, wherein the left pin portions of each of the left master links are substantially identical to the right bushing portions of each of the right master links, and the right pin portions of each of the right master links are substantially identical to the left bushing portions of each of the left master links.

16. A master track segment for a track assembly of a mobile machine, the master track segment comprising:

a track pad having a ground engaging surface opposite first and second link engaging surfaces, a lug protruding between the link engaging surfaces and above the link engaging surfaces with respect to the ground engaging surface, the lug configured to periodically engage a drive wheel of the machine, a first arm disposed between the first link engaging surface and the lug, and a second arm disposed between the second link engaging surface and the lug, both the first and second arms protruding above the lug with respect to the ground engaging surface;

a first pair of master links disposed on the first link engaging surface of the track pad, the first pair of master links including:

a first left master link comprising a left bushing portion and a left pin portion mated to one another along a first left mating interface, and a first right master link comprising a right bushing portion and a right pin portion mated to one another along a first right mating interface, the first right master link being laterally spaced apart from the first left master link such that the left and right bushing portions are substantially aligned with one another and the left and right pin portions are substantially aligned with one another; and a second pair of master links disposed on the second link engaging surface of the track pad, the second pair of master links including:
 a second left master link comprising a left bushing portion mated with a left pin portion along a second left mating interface, and
 a second right master link comprising a right bushing portion and a right pin portion mated to one another along a second right mating interface, the second right master link being laterally spaced apart from the second left master link such that the left and right bushing portions are substantially aligned with one another and the left and right pin portions are substantially aligned with one another.

17. The master track segment of claim 16, wherein each of the left bushing portions of the first and second pairs of master links are substantially identical to each of the right pin portions of the first and second pairs of master links, and each of the left pin portions of the first and second pairs of master links are substantially identical to each of the right bushing portions of the first and second pairs of master links.

18. The master track segment of claim 16, further comprising a plurality of fasteners securing the left bushing portions of each of the first and second left master links to the left pin portions of the respective first and second left master links, and securing the right bushing portions of each of the first and second right master links to the right pin portions of the respective first and second right master links.

19. The master track segment of claim 18, wherein each of the fasteners also secures the respective first and second left master links and respective first and second right master links to the track pad.

20. The master track segment of claim 16, wherein a first bushing connects the left and right bushing portions of the first pair of master links to one another, and a second bushing connects the left and right bushing portions of the second pair of master links to one another.

* * * * *